(12) United States Patent
Doddi et al.

(10) Patent No.: US 7,474,993 B2
(45) Date of Patent: Jan. 6, 2009

(54) SELECTION OF WAVELENGTHS FOR INTEGRATED CIRCUIT OPTICAL METROLOGY

(75) Inventors: Srinivas Doddi, Fremont, CA (US); Lawrence Lane, San Jose, CA (US); Vi Vuong, Fremont, CA (US); Michael Laughery, Austin, TX (US); Junwei Bao, Palo Alto, CA (US); Kelly Barry, Saratoga, CA (US); Nickhil Jakatdar, Los Altos, CA (US); Emmanuel Drege, San Jose, CA (US)

(73) Assignee: Timbre Technologies, Inc., Santa Clara, CA (US)

( * ) Notice: Subject to any disclaimer, the term of this patent is extended or adjusted under 35 U.S.C. 154(b) by 0 days.

(21) Appl. No.: 11/788,735

(22) Filed: Apr. 20, 2007

(65) Prior Publication Data
US 2007/0198211 A1    Aug. 23, 2007

Related U.S. Application Data

(62) Division of application No. 10/162,516, filed on Jun. 3, 2002, now Pat. No. 7,216,045.

(51) Int. Cl.
*G01R 13/00* (2006.01)
*G01R 31/26* (2006.01)

(52) U.S. Cl. .................... 702/196; 702/66; 702/159; 702/172; 438/16

(58) Field of Classification Search ............... 702/40, 702/66, 70–71, 127, 159, 172, 189, 193, 702/196; 438/16, 29, 7, 14; 356/328, 369, 356/484–488, 497–499
See application file for complete search history.

(56) References Cited

U.S. PATENT DOCUMENTS

| 4,804,266 | A |   | 2/1989  | Barshad |
| 4,862,406 | A | * | 8/1989  | Fisher ..................... 708/801 |
| 4,948,212 | A | * | 8/1990  | Cheng et al. ................. 359/7 |
| 5,432,607 | A |   | 7/1995  | Taubenblatt |
| 5,476,252 | A |   | 12/1995 | Yonezawa |
| 5,497,231 | A |   | 3/1996  | Schmidt |
| 5,712,716 | A |   | 1/1998  | Vanoli et al. |
| 5,742,389 | A |   | 4/1998  | Zavislan et al. |
| 5,835,221 | A |   | 11/1998 | Lee et al. |
| 5,956,148 | A |   | 9/1999  | Celii |

(Continued)

FOREIGN PATENT DOCUMENTS

JP    07-183348 A    7/1995

(Continued)

OTHER PUBLICATIONS

Japanese Office Action mailed Aug. 26, 2008, for Japanese Application No. 2004-509865 filed May 30, 2003, 3 pages. (English translation attached, 6 pages).

*Primary Examiner*—Eliseo Ramos Feliciano
*Assistant Examiner*—Mary C Baran
(74) *Attorney, Agent, or Firm*—Morrison & Foerster LLP

(57) ABSTRACT

Specific wavelengths to use in optical metrology of an integrated circuit can be selected using one or more selection criteria and termination criteria. Wavelengths are selected using the selection criteria, and the selection of wavelengths is iterated until the termination criteria are met.

20 Claims, 18 Drawing Sheets

U.S. PATENT DOCUMENTS

| | | |
|---|---|---|
| 6,002,479 A | 12/1999 | Barwicz et al. |
| 6,147,756 A | 11/2000 | Zavracky et al. |
| 6,192,064 B1 * | 2/2001 | Algots et al. .................. 372/99 |
| 6,219,142 B1 | 4/2001 | Kane |
| 6,271,047 B1 | 8/2001 | Ushio et al. |
| 6,288,782 B1 | 9/2001 | Worster et al. |
| 6,314,212 B1 | 11/2001 | Womack et al. |
| 6,368,881 B1 | 4/2002 | Brouillette et al. |
| 6,381,008 B1 | 4/2002 | Branagh et al. |
| 6,515,745 B2 | 2/2003 | Vurens et al. |
| 6,704,661 B1 | 3/2004 | Opsal et al. |
| 6,713,753 B1 * | 3/2004 | Rovira et al. ................ 250/225 |
| 6,716,300 B2 | 4/2004 | Kaji et al. |
| 6,735,333 B1 | 5/2004 | Yonezawa |
| 6,768,983 B1 | 7/2004 | Jakatdar et al. |
| 6,785,638 B2 | 8/2004 | Niu et al. |
| 6,891,626 B2 | 5/2005 | Niu et al. |
| 6,943,900 B2 | 9/2005 | Niu et al. |

FOREIGN PATENT DOCUMENTS

| | | |
|---|---|---|
| JP | 09-283585 A | 10/1997 |
| JP | 10-022205 A | 1/1998 |
| JP | 11-040635 A | 2/1999 |
| JP | 2002-506198 A | 2/2002 |

* cited by examiner

SELECTION OF WAVELENGTHS FOR INTEGRATED CIRCUIT OPTICAL METROLOGY

CROSS-REFERENCE TO RELATED APPLICATIONS

This application is a Divisional of U.S. patent application Ser. No. 10/162,516, filed Jun. 30, 2002, which is incorporated here by reference in its entirety.

BACKGROUND OF INVENTION

1. Field of Invention

The invention relates to integrated circuit (IC) metrology and more particularly to the selection of wavelengths to be used in optical metrology measurement, processing, and/or simulation.

2. Related Art

With the current drive towards smaller geometries of IC features, feature measurement is increasingly difficult as the size of the features become smaller. However, knowledge of the dimensions of gratings or periodic structures is essential in order to determine if the dimensions of the features are within the acceptable ranges and if, for example, a particular fabrication process causes the sidewalls of the features to be tapered, vertical, T-topped, undercut, or have footings.

The characteristics of gratings or periodic structures, such as their profiles, can be determined using optical metrology. In conventional optical metrology, optical metrology data is typically obtained for a specific number of measurement points corresponding to certain wavelengths, depending on the type and manufacturer of the optical metrology device. An extensive library of profiles and spectra created with the traditional number of wavelengths can result in lengthy library creation time and extensive search time. However, the use of all or a majority of the wavelengths measurements available from the metrology device does not necessarily provide more accurate data. In some instances, the use of all the wavelength measurement data occasionally may yield an erroneous library match.

SUMMARY OF INVENTION

In one exemplary embodiment, specific wavelengths for use in integrated circuit optical metrology can be selected by determining one or more termination criteria, setting one or more selection criteria, and selecting wavelengths based on the selection criteria. One or more iterations of the selection step can be performed until the termination criteria are met.

DETAILED DESCRIPTION OF EXEMPLARY EMBODIMENT(S)

In order to facilitate the description of the present invention, an ellipsometric optical metrology system is used to illustrate the concepts and principles. It is understood that the same concepts and principles equally apply to the other IC optical metrology systems such as reflectometric systems and the like. In a similar manner, although a diffraction spectra and profile library is frequently used to illustrate concepts and principles, the present invention equally applies to a data space comprising profile parameters and corresponding metrology signals.

Figure 1:
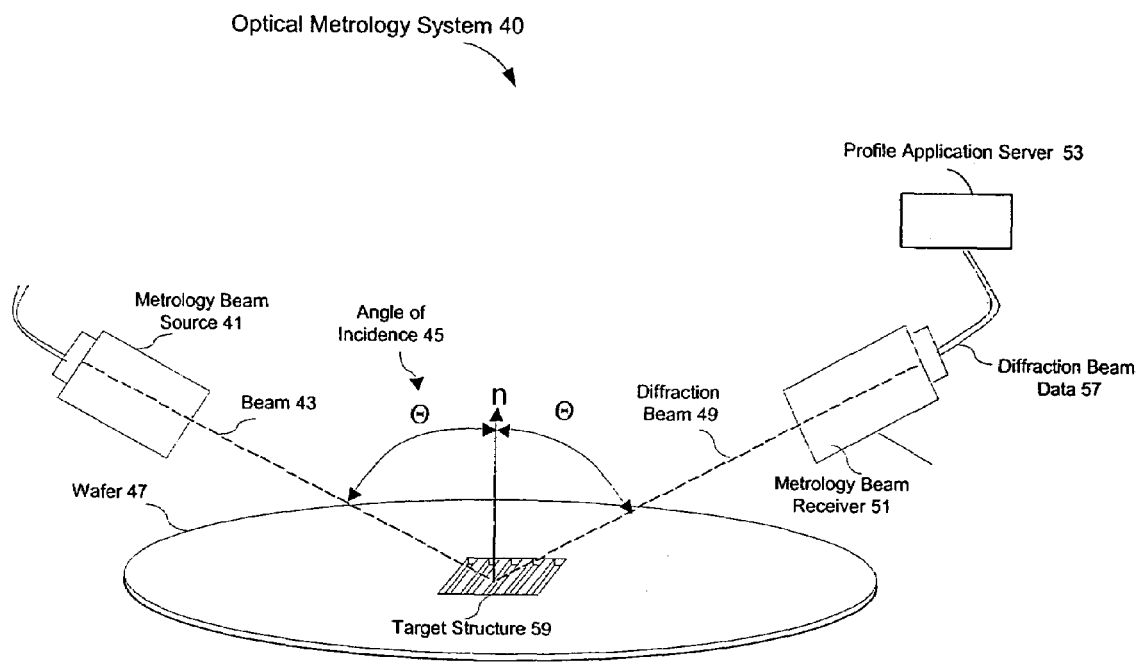
FIG. 1 is an architectural diagram illustrating the use of optical metrology to measure the diffraction spectra off integrated circuit periodic structures.

FIG. 1 is an architectural diagram illustrating the use of optical metrology to measure the diffraction signals off integrated circuit structures. The optical metrology system 40 includes a metrology beam source 41 projecting a beam 43 at the target structure 59 of a wafer 47. The metrology beam 43 is projected at an incidence angle θ towards the target structure 59. The diffraction beam 49 is measured by a metrology beam receiver 51. The diffraction beam data 57 is transmitted to a profile application server 53. The profile application server 53 compares the measured diffraction beam data 57 against a library of calculated diffraction beam data representing varying combinations of critical dimensions of the target structure and resolution. In one exemplary embodiment, the library instance best matching the measured diffraction beam data 57 is selected. The profile and associated critical dimensions of the selected library instance correspond to the cross-sectional profile and critical dimensions of the features of the target structure 59. The optical metrology system 40 may utilize a reflectometer, an ellipsometer, or other optical metrology device to measure the diffraction beam or signal. An optical metrology system is described in co-pending U.S. patent application Ser. No. 09/727,530 entitled "System and Method for Real-Time Library Generation of Grating Profiles" by Jakatdar, et al., filed on Nov. 28, 2000, and is incorporated in its entirety herein by reference.

To facilitate description of this invention, graphs of diffraction spectra off IC structures using an ellipsometer, e.g., cos (Δ) and tan (Ψ), will be utilized. It is understood that although ellipsometry and ellipsometric devices are discussed in exemplary embodiments, the present concepts and principle can apply to reflectometers and like devices and systems.

Figure 2:
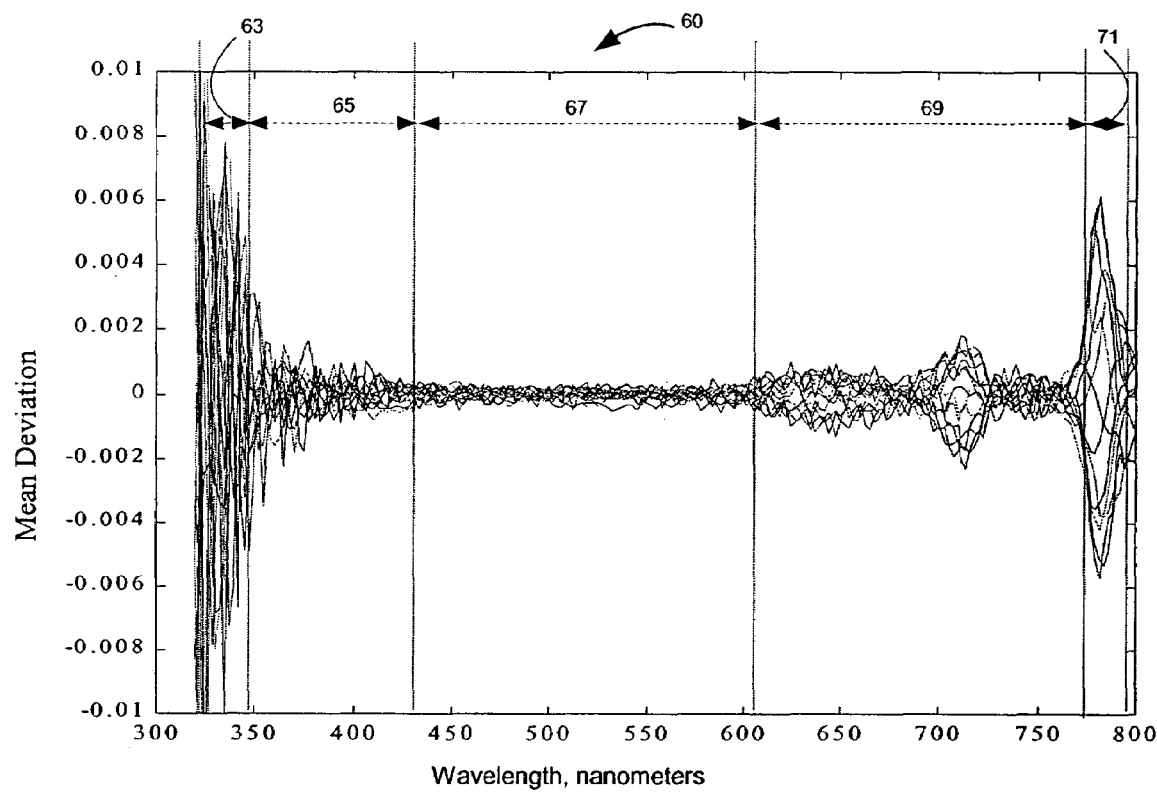
FIG. 2 are graphs of the mean deviation of different measurements of the same site in a wafer, highlighting wavelengths of high and low repeatability due to noise.

FIG. 2 includes graphs of the mean deviation of different diffraction measurements of the same site in a wafer, highlighting wavelengths of high and low repeatability due to noise. The graphs 60 of several diffraction measurements of the same site in a wafer are divided into several sections depending on the relative size of the mean deviation of the diffraction signal for a given wavelength. For this specific site in this wafer, section 63 of the graph, which represents the wavelength range of 320 to 345 nanometers (nm), has a relatively large mean deviation. Similarly, section 71, which represents the wavelength range of 780 to 795 nm, has a relatively large mean deviation. Section 65 and 69 of the graph, which represent the wavelength ranges of 345 to 410 nm and 620 to 780 nm, respectively, have moderate mean deviation. Section 67, which represents the wavelength range from 410 to 629 nm, has the least mean deviation.

The high mean deviation is typically caused by factors associated with the metrology device or metrology system and referred to as noise. Thus, the range of wavelengths with low mean deviation of the measured signal for the same site indicate that for this wafer, site, and metrology setup, the optical metrology measurements for these ranges have high repeatability. The high repeatability characteristic and mean deviation will be used below as a parameter for selecting wavelengths for optical metrology measurement and processing.

Figure 3:
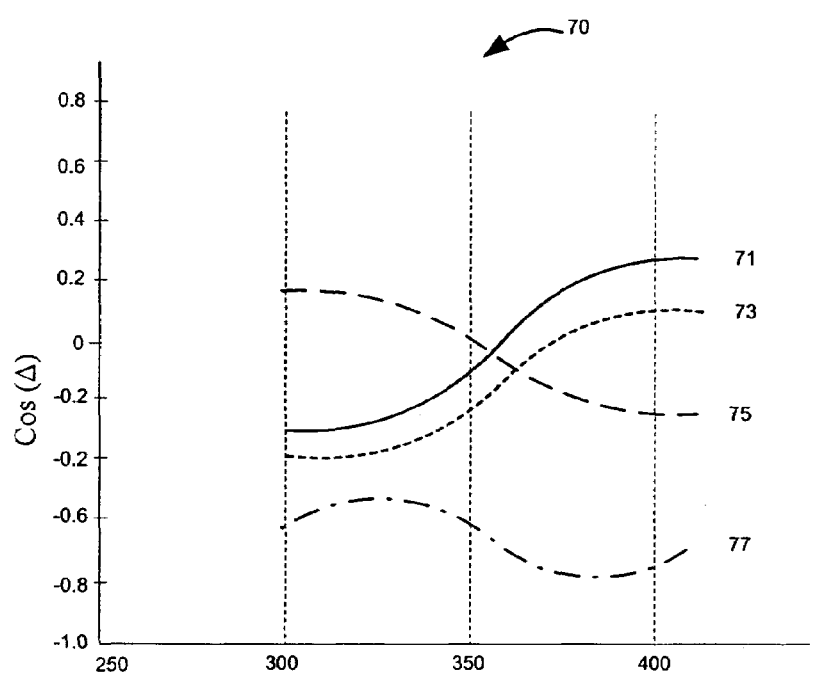
FIG. 3 illustrates cosine (Δ) graphs of diffraction spectra off IC structures showing high positive correlation,.high negative correlation, and no correlation of graphs over a range of wavelengths.

FIG. 3 illustrates cosine (Δ) graphs of diffraction spectra off IC structures showing high positive correlation, high negative correlation, and no correlation of graphs over a range of wavelengths. Cos (Δ) graph 71 is used as a baseline to analyze and compare the other three graphs. Graph 73 representing a graph of diffractions off a site in a wafer illustrates a high positive correlation with graph 71, that is, graph 73 proportionately increases or decreases in value at the same wavelengths as graph 71. Graph 75 illustrates a high negative correlation with graph 71, that is, graph 75 proportionately increases when graph 71 decreases and graph 75 proportionately decreases when graph 71 increases in value for the same wavelengths. Graph 77 neither increases nor decreases in proportion to the change in graph 71. Graph 77 is highly uncorrelated to either graph 71, 73 or 75. As will be discussed further below, if the diffraction spectrum for a structure is highly correlated for certain wavelengths or range of wavelengths, one wavelength for the correlated set of wavelengths can be used to predict or measure changes in the diffraction spectra.

Figure 4:
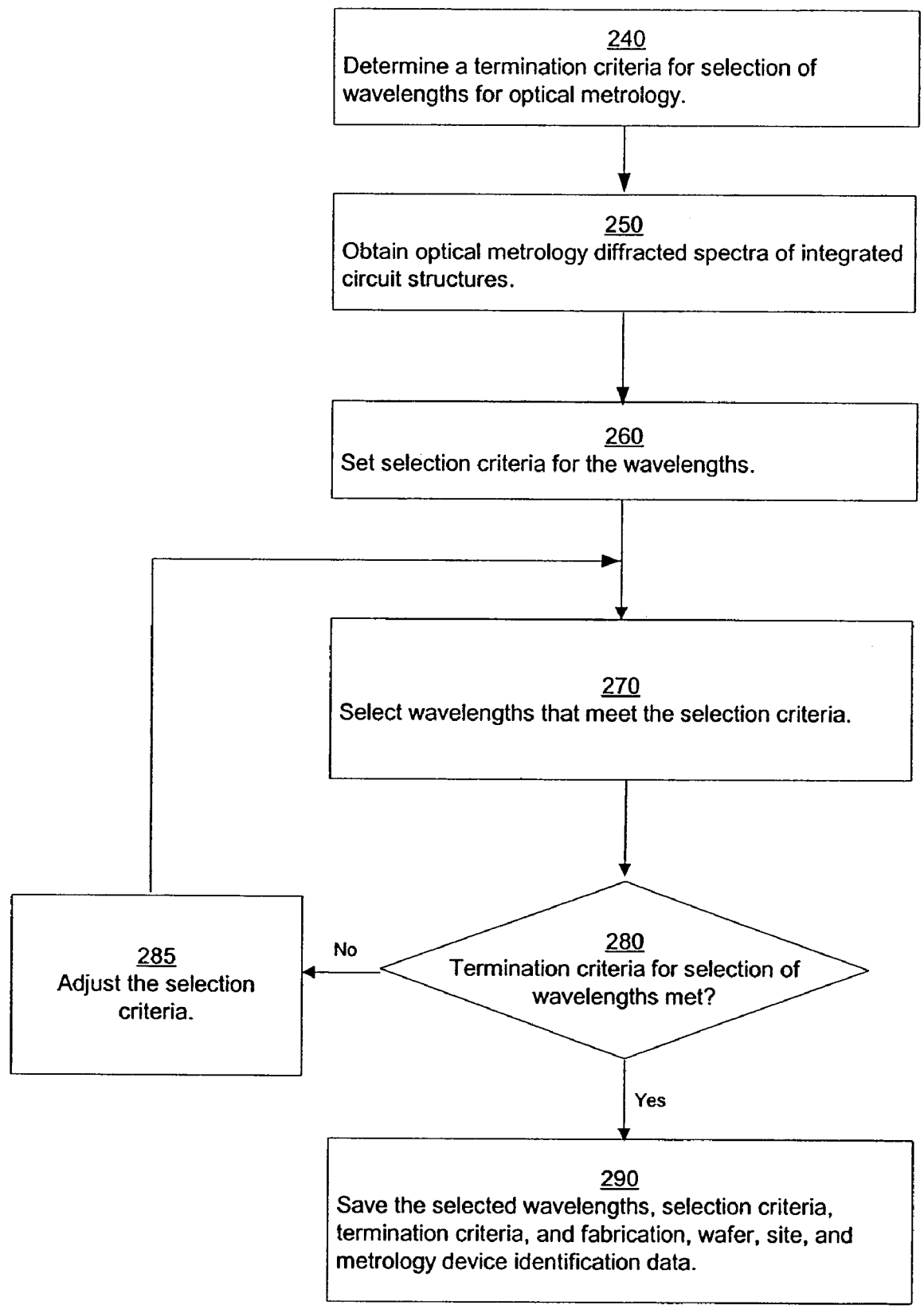
FIG. 4 is a flow chart of an exemplary process to select wavelengths for optical metrology.

FIG. 4 is a flow chart of an exemplary process to select wavelengths for optical metrology. Optical metrology devices vary by type and by manufacturer. Typically, the optical metrology devices measure the diffraction spectrum at numerous wavelengths. However, as discussed above, the measured diffraction spectrum may include noise at certain wavelengths or range of wavelengths. Furthermore, as discussed above, measured diffraction at certain wavelengths or range of wavelengths can provide repetitive data, the degree of data repetition measured by the correlation of diffraction signals between wavelengths. Thus, in one exemplary embodiment, specific wavelengths can be selected using a termination criteria and a selection criteria.

In step 240, the termination criteria for selection of wavelengths are determined. For example, the termination criteria may include an acceptable or preset cost function value of the best match diffraction spectrum from a library of diffraction spectra, the best match spectrum compared to the measured diffraction spectrum. Alternatively, the cost function value may be derived by comparing a selected-wavelength spectrum to a full-wavelength spectrum, where the selected-wavelength spectrum is a simulated diffraction spectrum of the nominal profile of the structure for a given metrology device using only the selected wavelengths, and the full-wavelength spectrum is a simulated diffraction spectrum of the nominal profile of the structure for the same metrology device using wavelengths typically used for the metrology device. A nominal profile can correspond to the design profile of an IC structure, which can typically be provided as data for use in simulation or library generation.

The cost function comparison is illustrated by the equations below:

Assume $V_1$ and $V_2$ are two vectors of size n, then the cost function of $V_1$ relative to $V_2$ is:

$$\text{Cost}(V_1, V_2) = \sqrt{\sum_{i=1}^{n}(V_{1i} - V_{2i})^2}. \quad (1.00)$$

In another exemplary embodiment, the termination criteria may be a goodness-of-fit (GOF) between the measured diffraction spectrum and the best match diffraction spectrum from a library. For a description of selecting a best match to a measured diffraction spectrum in a library of diffraction spectra and use of GOF, refer to co-pending U.S. patent application Ser. No. 09/727,530, entitled "System and Method for Real-Time Library Generation of Grating Profiles" by Jakatdar, et al., filed on Nov. 28, 2000, which is incorporated in its entirety herein by reference. Alternative termination criteria can include other curve-fitting procedures such chi-square and the like.

With reference to FIG. 4, in step 250, optical metrology diffraction spectra of IC structures are obtained. The optical metrology diffraction spectra may be from metrology measurements such as those done with an ellipsometer, reflectometer, and the like. Alternatively, metrology diffraction spectra may be obtained from historical data or from simulations of optical metrology. For a description of simulations of optical metrology utilizing a hypothetical profile, refer to co-pending U.S. patent application Ser. No. 09/770,997, entitled "Caching of Intra-layer Calculations for Rapid Rigorous Couple-Wave Analyses", by Niu et al., filed on Jan. 26, 2000, which is incorporated in its entirety herein by reference.

In step 260, the selection criteria for wavelengths are set. For example, the selection criteria may be signal-to-noise ratio of diffraction signals for the same wavelength or absolute mean deviation threshold of the diffraction signals using measurements of the same site in a wafer. Other selection criteria include correlation coefficient threshold, covariance threshold, and various combinations of individual criterion, discussed in more detail below.

In step 270, wavelengths meeting the selection criteria are selected. For example, one wavelength of a group of highly correlated wavelengths may be selected if the selection criteria included correlation coefficient.

In step 280, the termination criteria for selection of wavelengths are tested. If the termination criteria are not met, in step 285, the selection criteria for wavelengths are adjusted and the selection of wavelengths is repeated. Otherwise, the termination criteria are met, in step 290, the selected wavelengths, the selection and termination criteria, and the fabrication, wafer, site, and metrology device identification data are saved.

For example, a GOF of 0.995 between the measured spectrum and the best match library spectrum using the selected wavelengths may be set as the termination criteria. If the calculated GOF is equal to or greater than 0.995, i.e., the termination criteria are met, the process in step 290 is performed. Alternatively, a GOF between the best match spectrum from a library using the full set of wavelengths for the metrology device compared to the best match spectrum from the same library using only the selected wavelengths may be used as the termination criteria.

Adjustment of the selection criteria for wavelengths may also be performed using an optimization procedure. For example, a mathematical expression, such as a linear or polynomial equation, specifying the relationship of the termination criteria as a function of the selection criteria for wavelengths may be used to determine the next values of the selection criteria in the optimization procedure.

Figure 5:
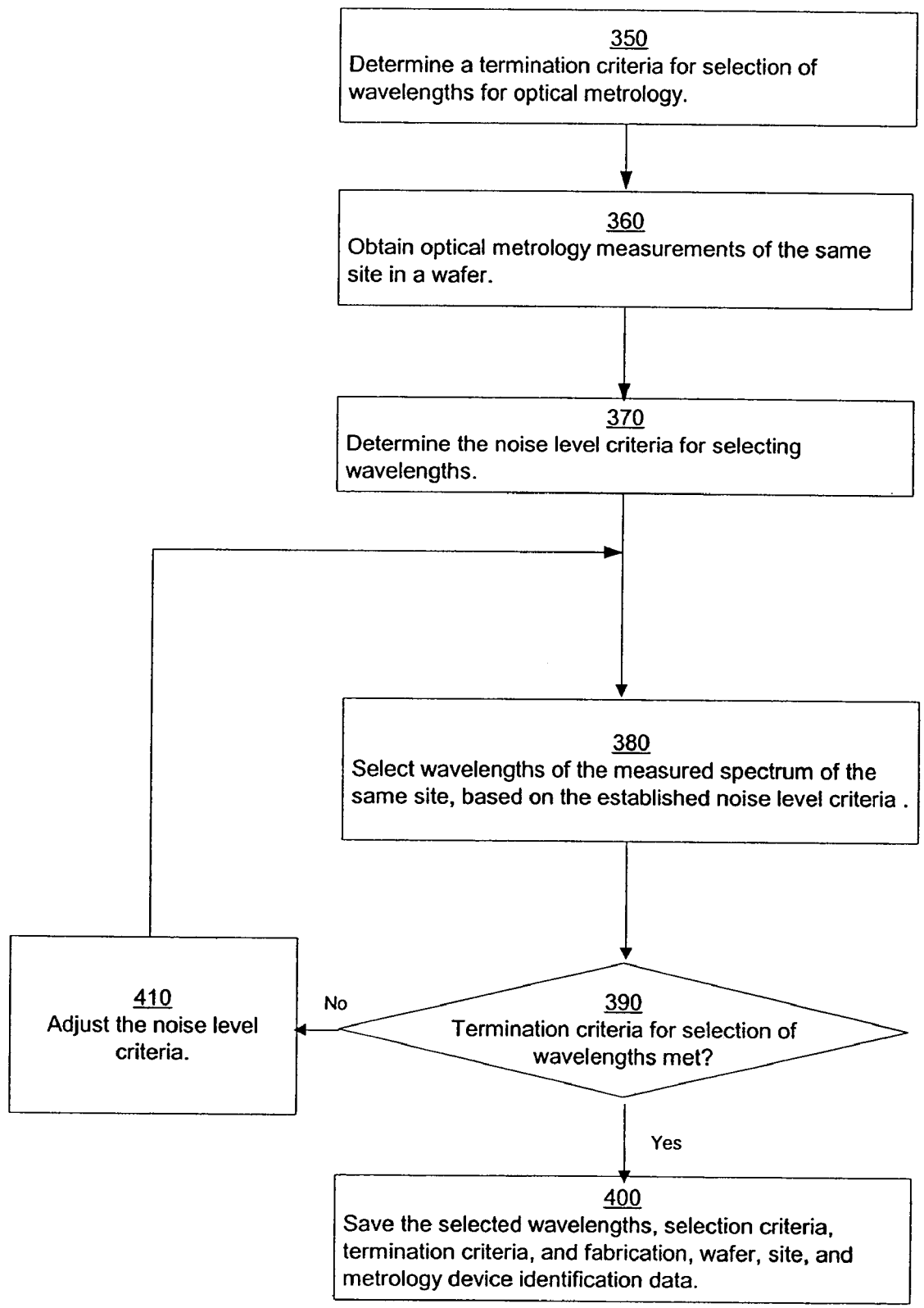
FIG. 5 is a flow chart of an exemplary process to select wavelengths for optical metrology utilizing signal-to-noise selection criteria.

FIG. 5 is a flow chart of an exemplary process to select wavelengths for optical metrology utilizing signal-to-noise selection criteria. In step 350, the termination criteria for selection of wavelengths are determined. For example, the termination criteria may include a cost function value equal to or less than a predetermined amount or the GOF being equal to or higher than a predetermined amount.

In step 360, optical metrology measurements of the same site in a wafer are obtained. In step 370, the noise level criteria for selecting a wavelength are determined. For example, wavelengths wherein the cos (Δ) for the same measured site varies within a range of ≦+0.006 and ≧−0.006 from the mean cos (Δ) for the measurements of the same site may be selected. Alternatively, wavelengths with a noise level greater than 1, 2, or 3σ standard deviation may be excluded.

In step 380, wavelengths are selected or excluded based on the noise level selection criteria, using the optical metrology measurements from the same site of the wafer obtained in a previous step. In step 390, the termination criteria are tested and the noise level criteria are adjusted in step 410 if the termination criteria are not met and the selection of wavelengths is repeated. Otherwise, the selected wavelengths and associated data are saved in step 400. Similar to process described for FIG. 4, the next value of the noise level may be derived using an optimization procedure.

Figure 6:
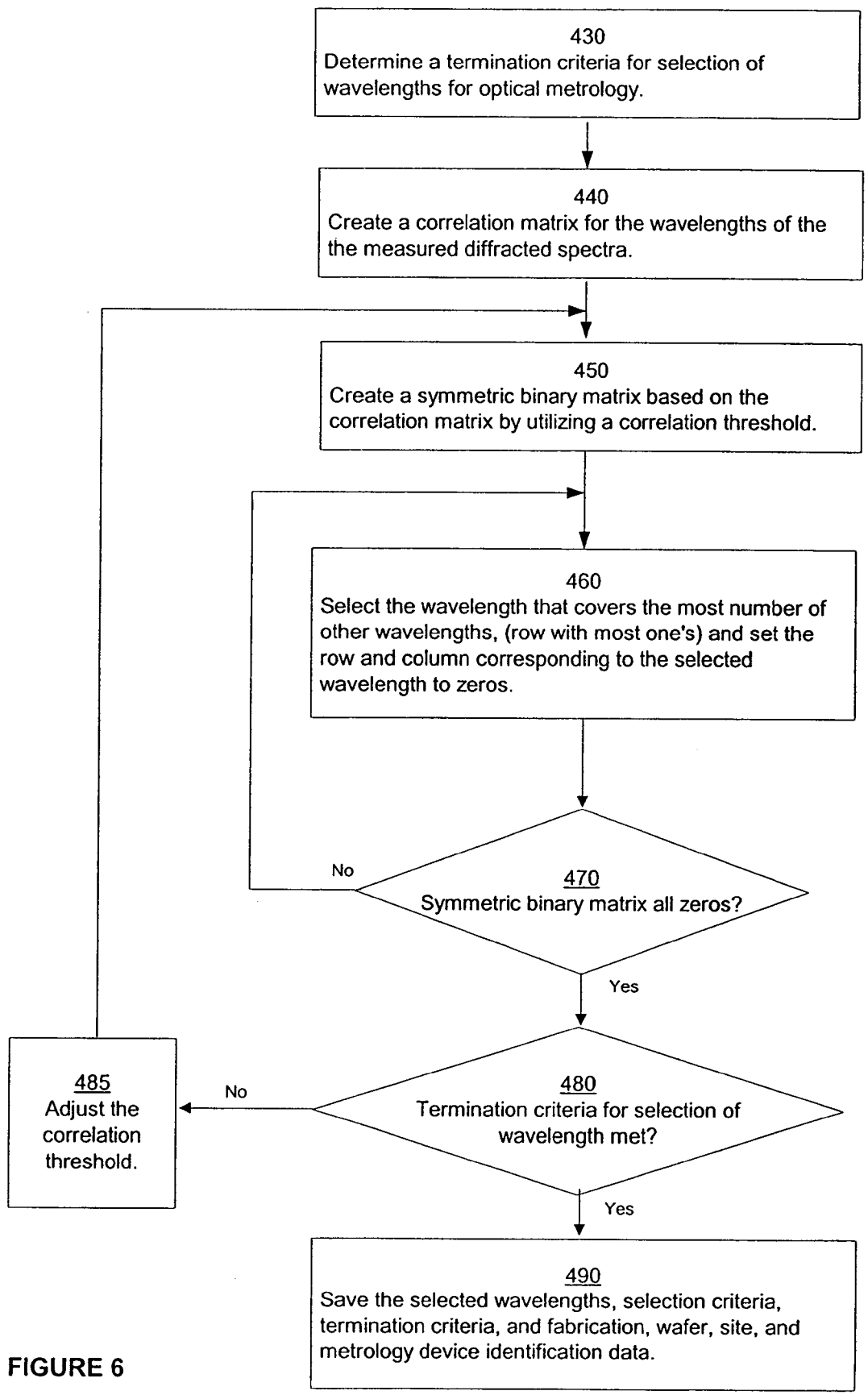
FIG. 6 is a flow chart of an exemplary process to select wavelengths for optical metrology utilizing correlation coefficients.

FIG. 6 is a flow chart of an exemplary process to select wavelengths for optical metrology utilizing correlation coefficients. In step 430, the termination criteria for selection of wavelengths are determined. For example, the termination criteria may include a cost function value equal to or less than a predetermined amount or the GOF being equal to or higher than a predetermined amount.

In step 440, a correlation matrix for the wavelengths of measured diffraction spectra is created. For example, an optical metrology device such as an ellipsometer may have 53 measurement points, each point corresponding to diffraction measurements at a specific wavelength. The correlation matrix is created from values of the correlation coefficients, the correlation coefficients can be calculated from the formula:

$$r = \frac{\sum_i (x_i - \bar{x})(y_i - \bar{y})}{\sqrt{\sum_i (x_i - \bar{x})^2} \sqrt{\sum_i (y_i - \bar{y})^2}} \quad (2.00)$$

where $x_i$ and $y_i$ are a pair of diffraction spectrum values at two optical metrology measurement points, $\bar{x}$ is the mean of $x_i$'s and $\bar{y}$ is the mean of $y_i$'s. The value of r lies between −1 and +1 inclusive. A value of +1 can correspond to complete positive correlation and a value of −1 can correspond to complete negative correlation. A value of r close to zero can correspond to the x and y not being correlated. The correlation matrix C can be created from the values of r by the equation:

$$-1 \leq C(x_i, y_i) \leq +1. \quad (3.00)$$

Referring to FIG. 6, in step 450, a symmetric binary matrix, M, based on the correlation matrix C is created by testing if a correlation coefficient threshold is met. For example, if a correlation coefficient threshold of absolute 0.60 is chosen, then all members of the correlation matrix C with an absolute value of 0.60 or higher are replaced with 1's and the rest with 0's. The symmetric binary matrix M has as many columns as there are rows wherein the columns and rows correspond to a wavelength. Using the example of an M with four wavelengths m1, m2, m3, and m4, below is an example of the symmetric binary matrix for the four wavelengths:

|  | m1 | m2 | m3 | m4 |
|---|---|---|---|---|
| m1 | 1 | 0 | 1 | 0 |
| m2 | 0 | 1 | 1 | 1 |
| m3 | 1 | 1 | 1 | 1 |
| m4 | 0 | 1 | 1 | 1 |

It should be noted that where the column and row of the same wavelength intersect, the binary matrix value is 1, being that the correlation coefficient of spectrum for a measurement point to itself is 1.

Referring to FIG. 6, in step 460, the wavelength that covers the most number of other wavelengths is selected, this wavelength being the row with the most one's in the symmetric binary matrix M. In the example above, row m3 has the most 1's, thus, the wavelength represented by m3 would be selected. Further to step 460, the values of row m3 and column m3 are set to 0's. The resulting M is:

|  | m1 | m2 | m3 | m4 |
|---|---|---|---|---|
| m1 | 1 | 0 | 0 | 1 |
| m2 | 0 | 1 | 0 | 1 |
| m3 | 0 | 0 | 1 | 0 |
| m4 | 1 | 1 | 0 | 1 |

In step 470, the symmetric binary matrix is queried if all the values are 0's. If not, step 460 is repeated. An all 0's value for the symmetric binary matrix values means a representative of all the wavelengths have been selected for a given correlation coefficient threshold. If the symmetric binary matrix values are all 0's, in step 480, the test for the termination criteria for selection of wavelengths is queried. As discussed above, the termination criteria may be a GOF of 0.995 between a best match of a measured spectrum using the selected wavelengths and a best match of the measured spectrum using the full range of wavelengths, the best match spectrum obtained from a library of spectra created for the IC structure. If the termination criteria are not met, the correlation coefficient threshold is adjusted (step 485) and the process is iterated starting at step 450. Otherwise, the selected wavelengths and associated data are saved in step 490. Adjustment of the selection criteria for wavelengths may also be performed using an optimization procedure as previously described.

Figure 16:
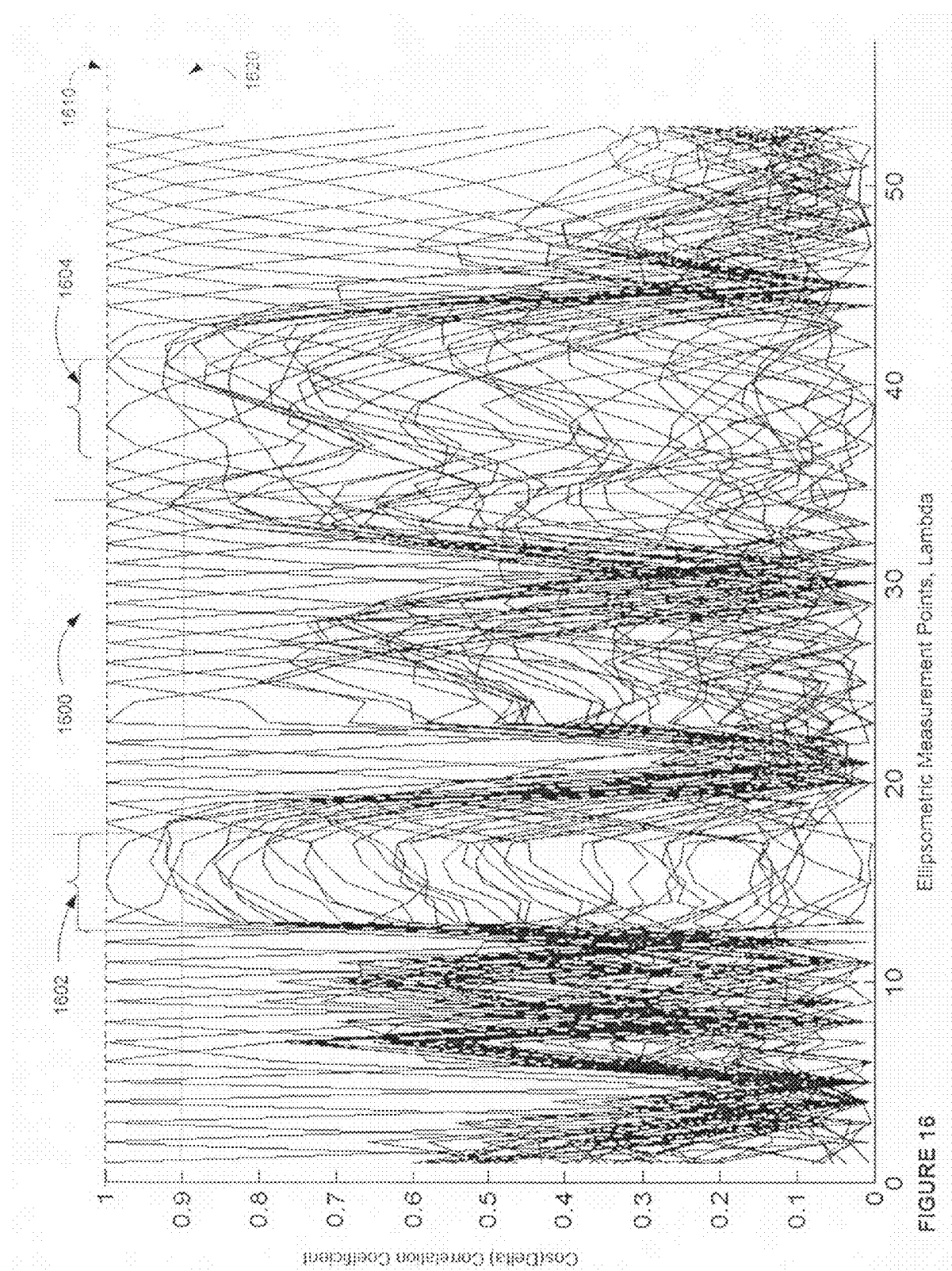
FIG. 16 are graphs of correlation coefficients of ellipsometric cos (Δ) measurements for different sites in a wafer illustrating correlation between wavelengths.
Figure 17:
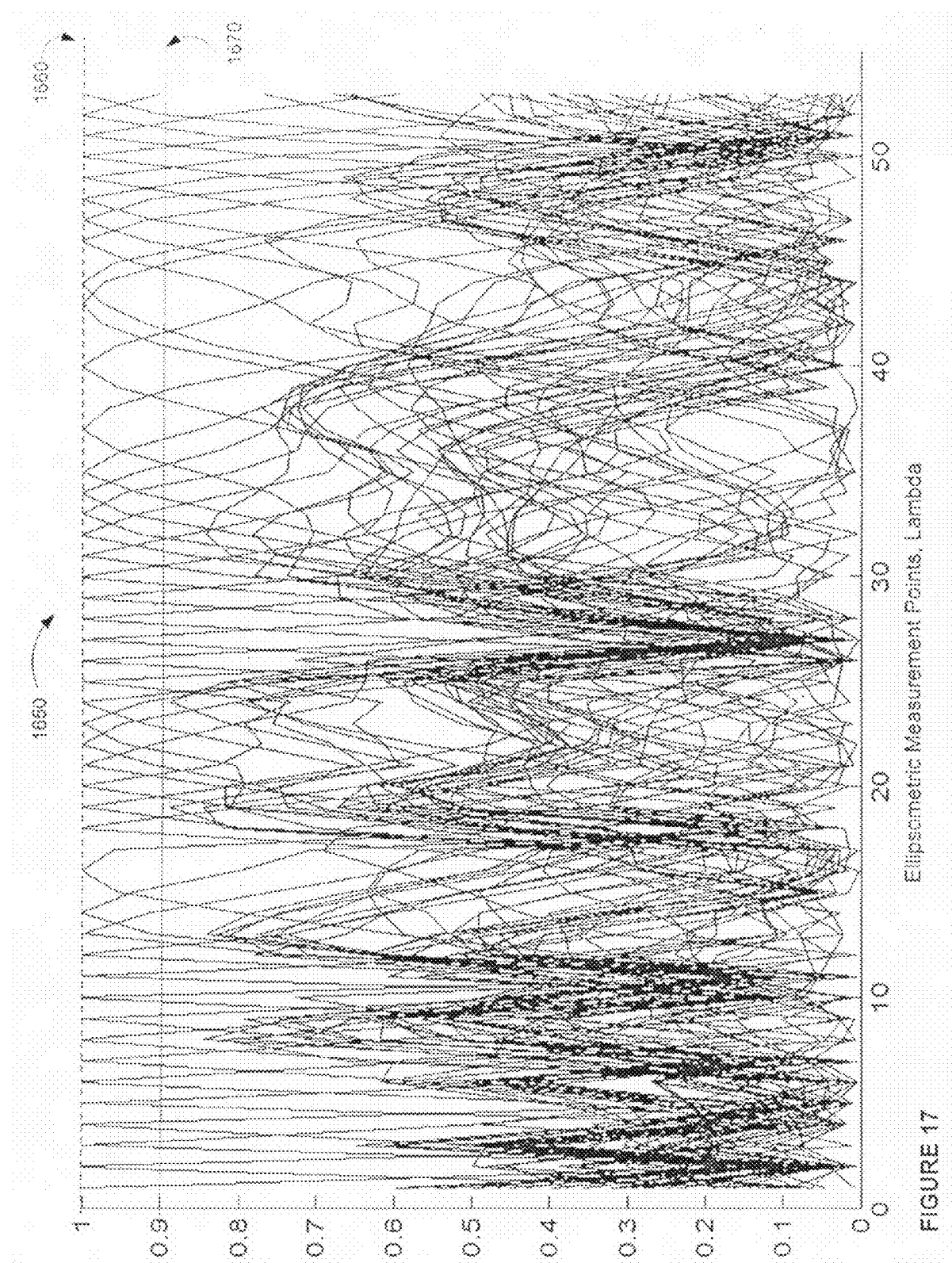
FIG. 17 shows graphs of correlation coefficients of ellipsometric tan (Ψ) measurements for different sites in a wafer illustrating correlation between wavelengths.

FIG. 16 and FIG. 17 are graphs of the correlation coefficients utilizing the measured diffraction ellipsometric cos ($\Delta$) and tan ($\Psi$) signals respectively for a range of measurement points, lambda. The measurement points 1 to 53 correspond to specific wavelengths in the 300 to 720 nanometers. Referring to FIG. 16, the absolute correlation coefficient of cos ($\Delta$) 1600 shows two horizontal lines 1610 and 1620. At the top horizontal line 1610, if the correlation coefficient threshold of 1 (complete correlation) is used, all the wavelengths are selected. For correlation coefficient threshold of less than 1, less wavelengths are required to provide coverage of all the wavelengths. For example; at a correlation coefficient threshold of 0.90, wavelengths associated with measurement points 12 to 18, bracket 1602 of FIG. 16, and with measurement points 37 to 42, bracket 1604, are covered by other wavelengths, therefore, only one representative of these group of wavelengths would be selected. A similar wavelength selection process can be applied to the correlation coefficients of tan ($\Psi$) graph in FIG. 17.

Figure 7:
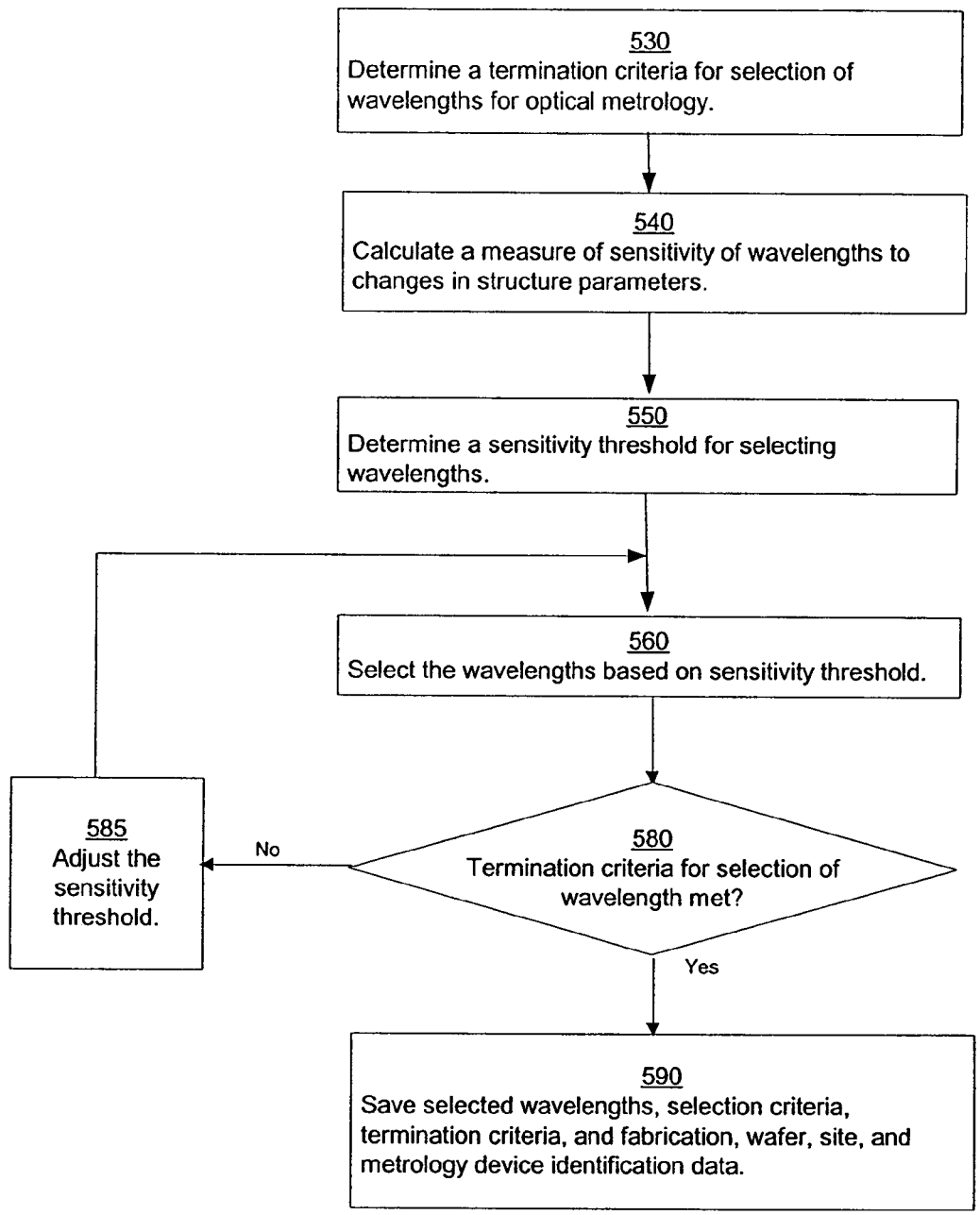
FIG. 7 is a flow chart of an exemplary process for utilizing sensitivity of wavelengths to structure parameter changes to select wavelengths for optical metrology.

FIG. 7 is a flow chart of an exemplary process for utilizing sensitivity of wavelengths to structure parameter changes to select wavelengths for optical metrology. Sensitivity of a wavelength is a measure of the change of diffraction spectra at that wavelength corresponding to a change of the structure profile. One way to measure sensitivity is the covariance of the wavelengths. Here, covariance is a statistical measure of the tendency of two wavelengths to change in conjunction with each other.

Similar to previous embodiments, in step 530, the termination criteria for selection of wavelengths are determined. For example, the termination criteria may include a cost function value equal to or less than a predetermined amount or the GOF being equal to or higher than a predetermined amount as discussed in FIG. 4.

In step 540, the measure of sensitivity of wavelengths to changes in structure parameters is calculated. A sensitivity threshold for selecting wavelengths is determined in step 550. Based on the sensitivity threshold, wavelengths are selected in step 560. Similar to previous embodiments, in step 580, the termination criteria are tested. In step 585, the sensitivity threshold is adjusted if the termination criteria are not met and the selection of wavelengths is repeated. Otherwise, the selected wavelengths and associated data are saved in step 590. Adjustment of the selection criteria for wavelengths may also be performed using an optimization procedure as previously described.

Figure 8:
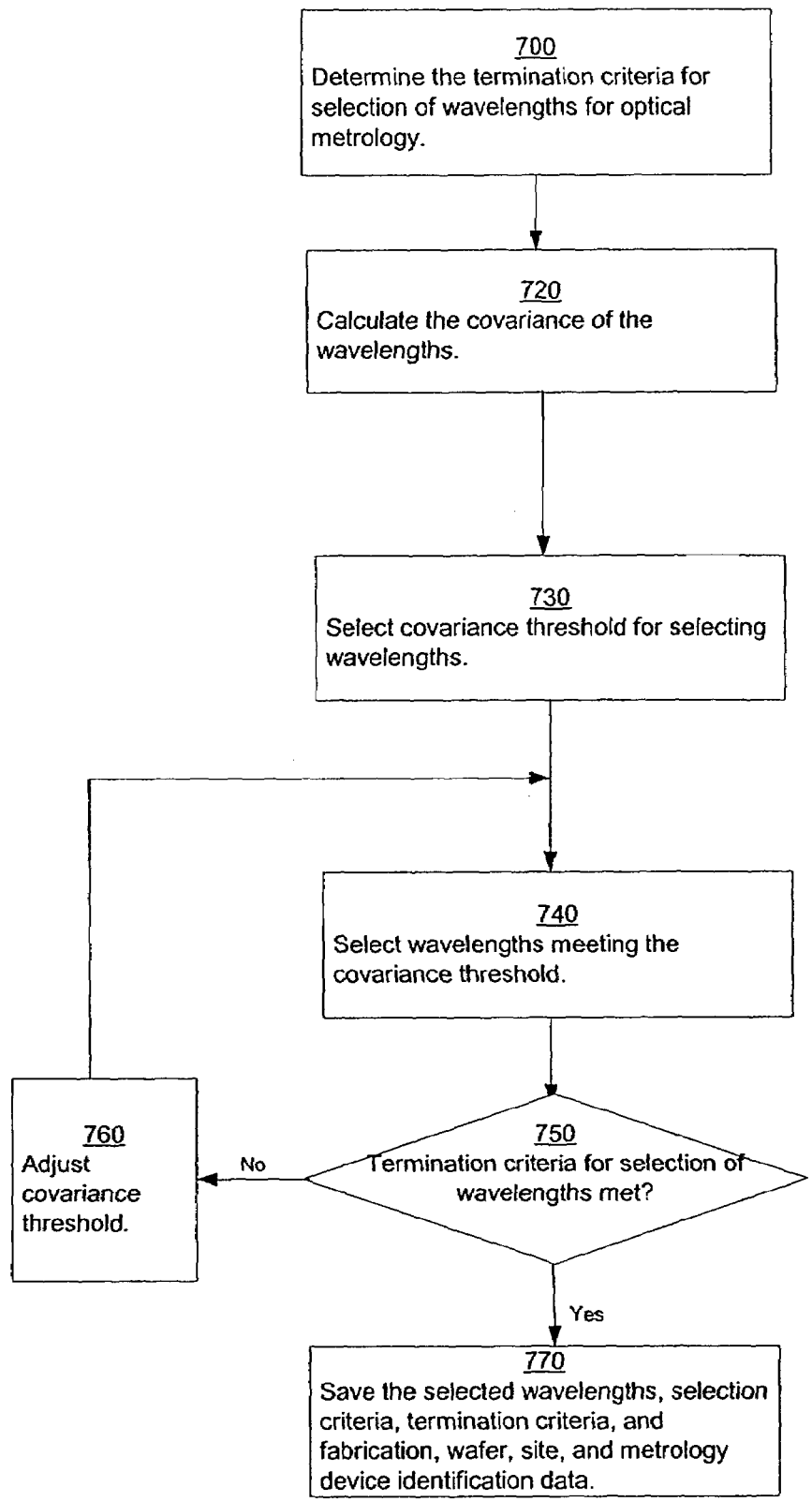
FIG. 8 is a flow chart of an exemplary process for utilizing covariance to select wavelengths for optical metrology.

FIG. 8 is a flow chart of an exemplary process of utilizing covariance to select wavelengths for optical metrology. Covariance is equal to the product of standard deviations and correlation coefficients; expressed in formula form:

$$\text{Cov}(i,j)=\{[x(1,i)-m(i)][x(1,j)]+\ldots+[x(n,i)-m(i)][x(n,j)-m(j)]\}/(n-1) \quad (4.00)$$

where Cov (i,j) is the covariance of diffraction spectrum for wavelength i and j; m(i) is the mean of diffraction spectrum for wavelength i; m(j) is the mean of diffraction spectrum for wavelength j; x(1,j) is the diffraction spectrum measurement at measurement point 1 relative to j and so on; while n is the number of measurement points. If diffraction spectra for wavelengths i and j tend to increase together, then Cov (i,j)>0. If diffraction spectrum for wavelength i tends to decrease when diffraction spectrum for j tends to increase, then Cov (i,j)<0. If the diffraction spectrum for wavelength i and j are independent, then Cov (i,j)≈0. Wavelengths with high absolute covariance generally are selected, since a change in a component of the structure parameters would be reflected in the measured diffraction spectra.

Referring to FIG. 8, similar to previous embodiments, in step 700, the termination criteria for selection of wavelengths are determined. For example, the termination criteria may include a cost function value equal to or less than a predetermined amount or the GOF being equal to or higher than a predetermined amount.

In step 720, the covariance of wavelengths diffraction spectra is calculated. A covariance threshold for selecting wavelengths is determined in step 730. Based on the covariance threshold, wavelengths are selected in step 740. Similar to previous embodiments, in step 750, the termination criteria are tested. In step 760, the sensitivity threshold is adjusted if the termination criteria are not met and the selection of wavelengths is repeated. Otherwise, the selected wavelengths and associated data are saved in step 770. Adjustment of the selection criteria for wavelengths may also be performed using an optimization procedure as previously described.

Figure 18:
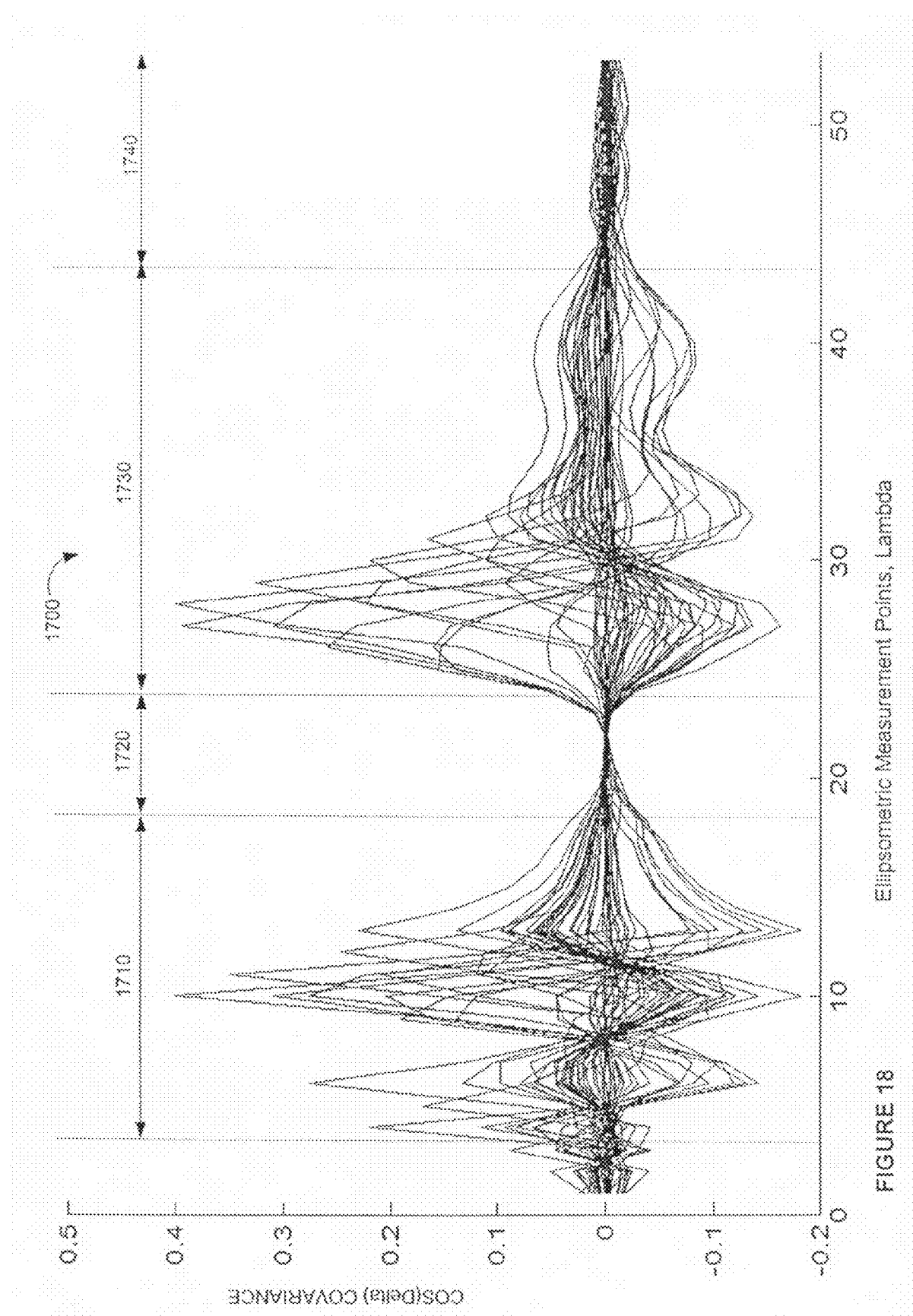
FIG. 18 are graphs of covariance of ellipsometric cos (Δ) measurements for different sites in a wafer illustrating covariance between wavelengths.
Figure 19:
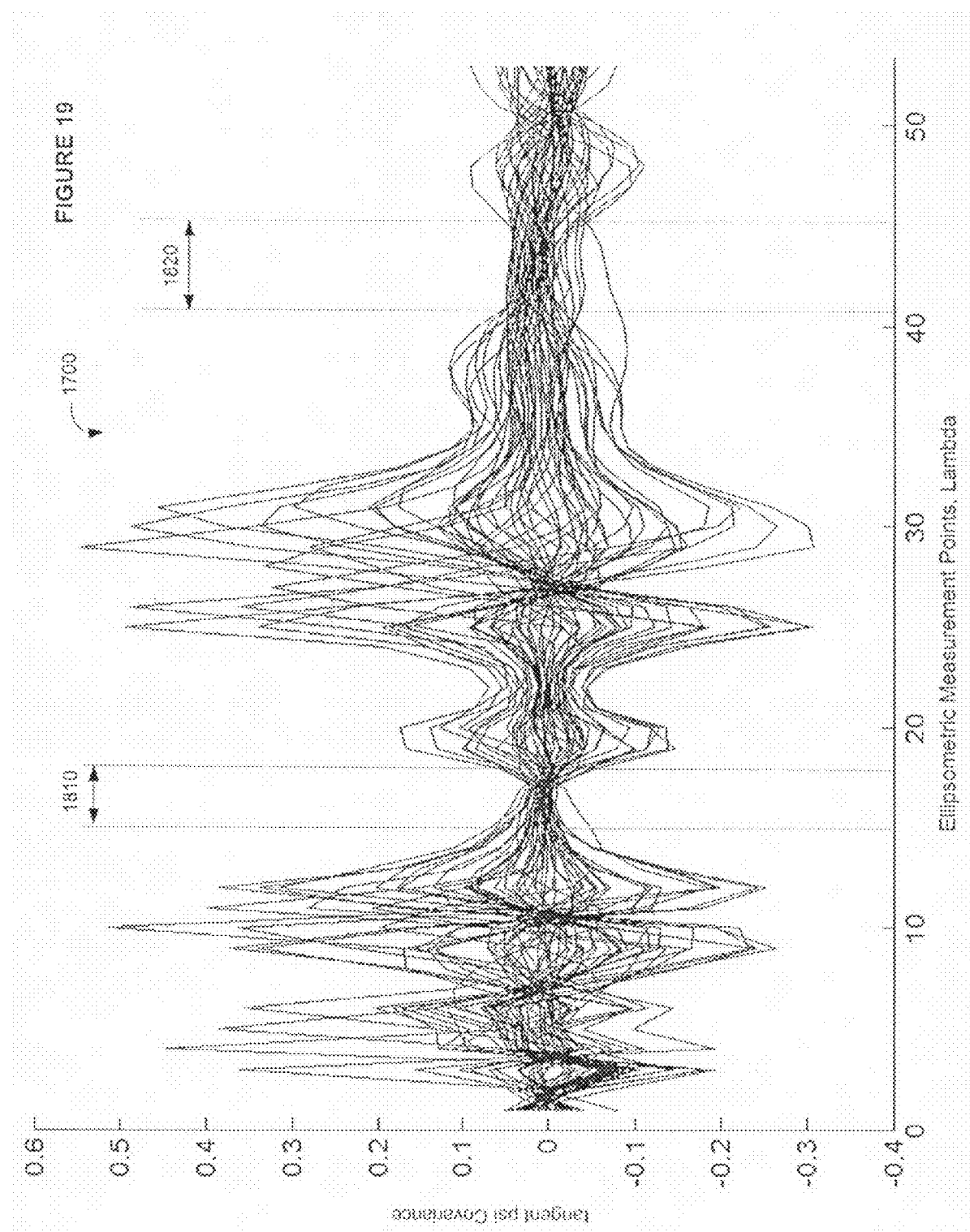
FIG. 19 shows graphs of covariance of ellipsometric tan (Ψ) measurements for different sites in a wafer illustrating covariance between wavelengths.

FIG. 18 and FIG. 19 are graphs of covariance of ellipsometric cos ($\Delta$) and tan ($\Psi$) measurements for different sites in a wafer, respectively, illustrating covariance between wavelengths. The graph 1700 in FIG. 18 is divided into sections depending on the covariance value. Sections 1710 and 1730 show a substantial covariance whereas sections 1720 and 1740 show little covariance. Depending on the value of covariance threshold set, different sections of the graph representing different wavelengths are selected. FIG. 19 can be analyzed in the same manner as FIG. 18.

Figure 20:
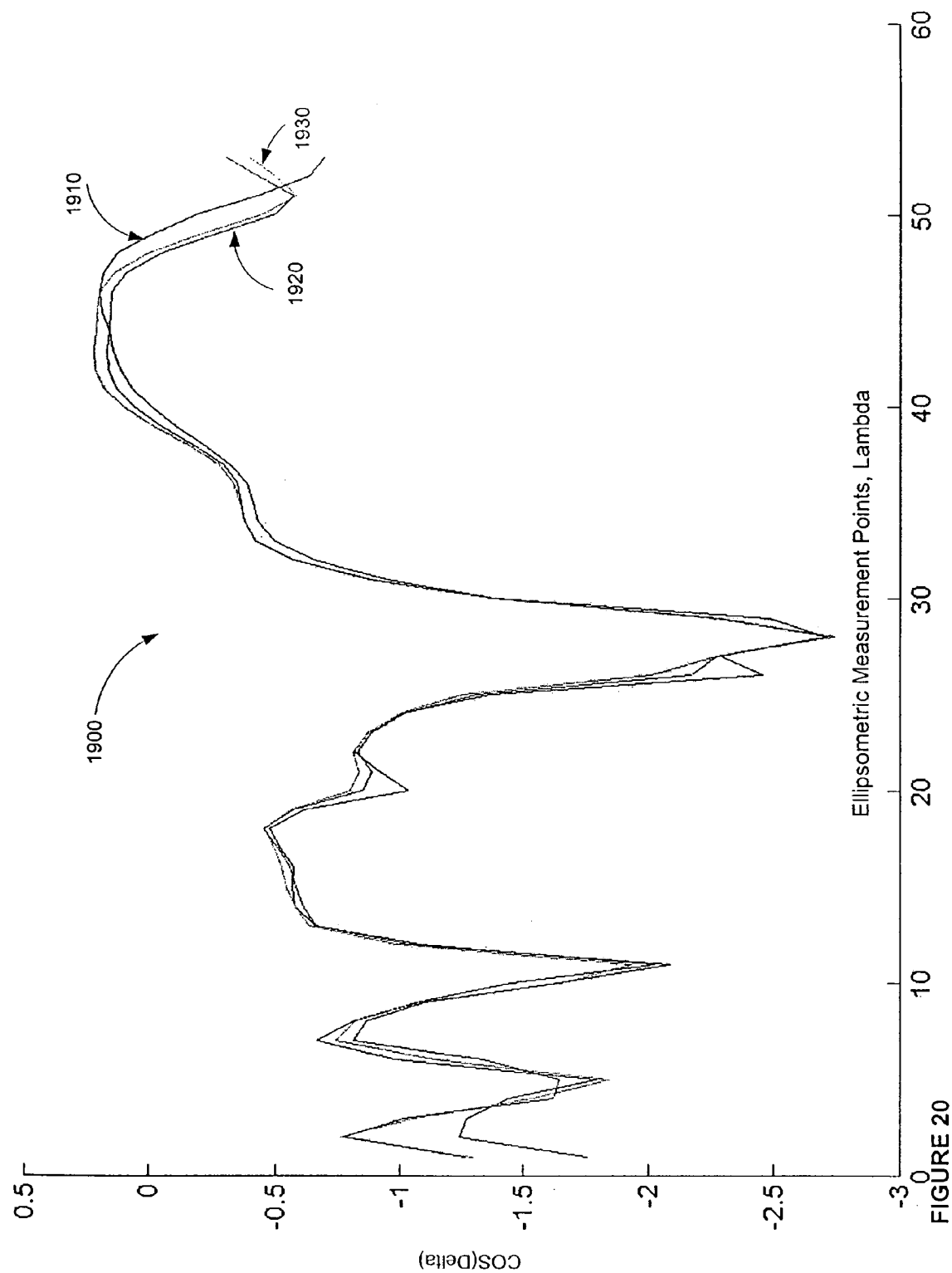
FIG. 20 is a cos (Δ) graph of the best match of a measured spectrum using selected wavelengths versus a cos (Δ) graph of the best of match using the full spectrum of wavelengths provided by the metrology device vendor.

FIG. 20 is a cos ($\Delta$) graph of the best match of a measured spectrum using selected wavelengths versus a cos ($\Delta$) graph of the best match using the full spectrum of wavelengths, which may be provided by the metrology device vendor. The graphs 1900 include the measured spectrum 1910 with the two best match spectra from a library. Graph 1920 is a graph of the best match spectrum when the termination criteria of a wavelength selection process are set with a GOF of 0.95. Graph 1930 is a graph of the best match spectrum when the termination criteria of the wavelength selection process are set with a GOF of 0.99. Fewer wavelengths (not shown) were selected with the GOF of 0.95 versus the GOF of 0.99. In general, the higher the GOF, the greater the number of wavelengths selected using the same selection criteria. Depending on the requirements of an application, a lower GOF may be selected especially where the fabrication steps and variables of the IC structure are still in the development stages. However, for a stabilized fabrication process or for production usage, a higher GOF may be specified or required by the application.

Figure 9:
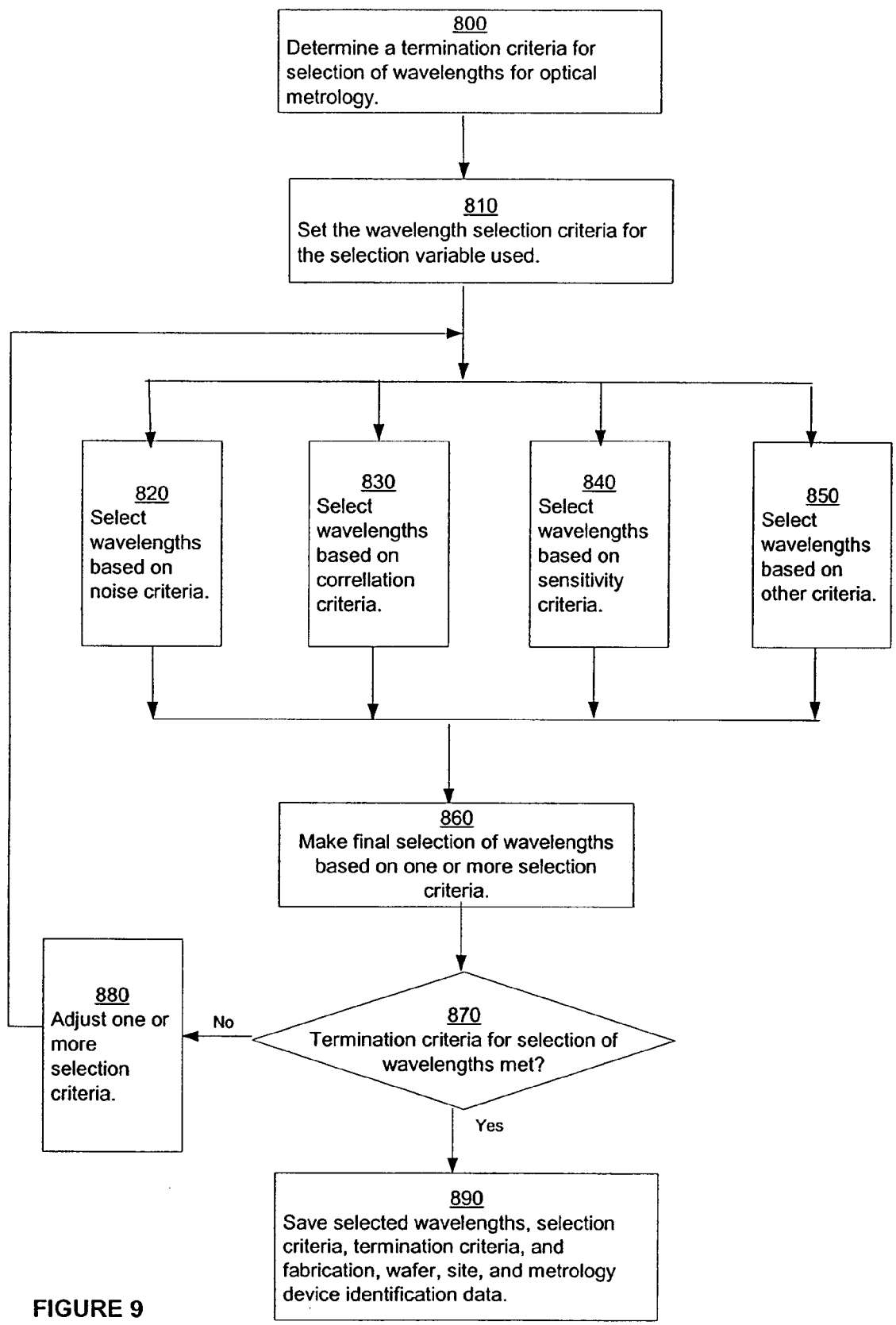
FIG. 9 is a flow chart of an exemplary process to select wavelengths for optical metrology utilizing one or more selection techniques.

FIG. 9 is a flow chart of an exemplary process to select wavelengths for optical metrology utilizing one or more selection techniques. Similar to previous embodiments, in step 800, the termination criteria for selection of wavelengths are determined. Depending on the number of wavelength selection procedures used for an application, the wavelength selection criteria for each procedure is set in step 810.

The wavelength selection procedures 820, 830, 840, and/or 850 may be activated in parallel or activated serially, the order of activation being a user option. Wavelength selection may be done using noise criteria (step 820), correlation criteria (step 830), sensitivity criteria (step 840), and/or other criteria specific to the application (step 850).

In step 860, the final wavelength selection based on one or more criteria are made. In step 870, the termination criteria are tested. In step 880, one or more selection criteria are adjusted if the termination criteria are not met, repeating the selection of wavelengths. Otherwise, the selected wavelengths and associated data are saved in step 890. As previously described, adjustment of the selection criteria for wavelengths may also be performed using an optimization procedure.

In one exemplary embodiment, wavelengths meeting noise criteria are selected for further processing. Working with the selected wavelengths, a wavelength is further selected as a representative of a group of correlated wavelengths or selected as an uncorrelated wavelength. Working further with the remaining wavelengths, those wavelengths meeting a sensitivity threshold are selected. The selected wavelengths may be used in run time regression processing to determine CD's of structures. In another application, the selected wavelengths are used for creating libraries of simulated diffraction spectra and associated profile data.

Figure 10:
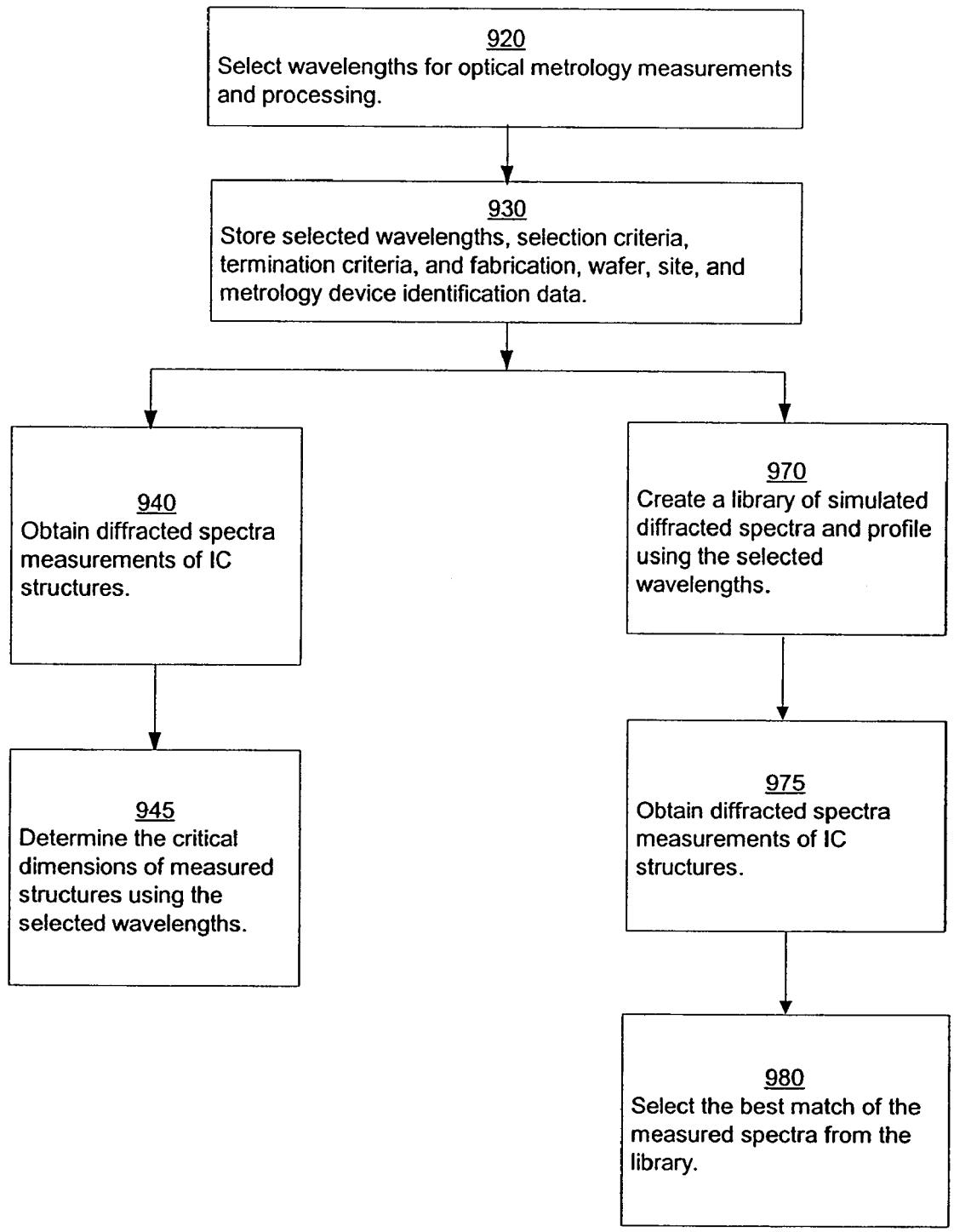
FIG. 10 is a flow chart of an exemplary process for selecting wavelengths and utilizing the selected wavelengths to determine structure profile data.

FIG. 10 is a flow chart of an exemplary process for selecting wavelengths and utilizing the selected wavelengths to determine structure profile data in exemplary embodiments of the present invention. In step 920, wavelengths for optical metrology measurements and processing are selected. The selected wavelengths and associated data are stored in step 930. In one embodiment, step 940, diffraction spectra measurements off IC structures are obtained. In step 945, using selected wavelengths in step 930, CD's of the measured structures are determined using regression approaches. For a detailed description of regression techniques, refer to co-pending U.S. patent application Ser. No. 09/923,578, entitled "Method and System of Dynamic Learning Through a Regression-Based Library Generation Process", filed Aug. 6, 2001, by Niu et al., which is incorporated in its entirety herein by reference.

In an alternative embodiment, a library of simulated diffraction spectra and associated profile data is created, in step 970, using the previously selected wavelengths only. In step 975, diffraction spectra measurements are obtained. In step 980, the best match spectrum from the selected-wavelength spectra library is selected for each measured diffraction spectrum.

Figure 11:
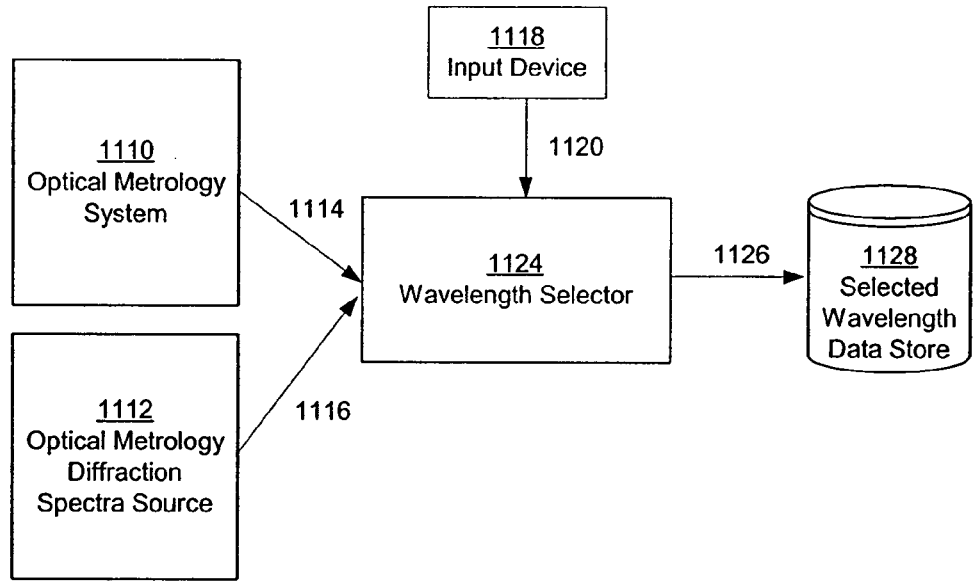
FIG. 11 is an architectural diagram of a wavelength selector in an exemplary embodiment.

FIG. 11 is an architectural diagram of a wavelength selector in an exemplary embodiment. An optical metrology system 1110 transmits metrology measurements 1114 or an optical metrology diffraction source 1112 transmits prerecorded optical metrology measurements in a storage medium 1116 into the wavelength selector 1124. The wavelength selector 1124 receives selection criteria input 1120 from an input device 1118, specifying the type of selection criteria, sequence of using the selection criteria, and termination criteria. Using one or more selection criteria and the termination criteria, the wavelength selector 1124 selects wavelengths and store these selected wavelengths and associated identification data 1126 in the selected wavelength data store 1128.

Figure 12:
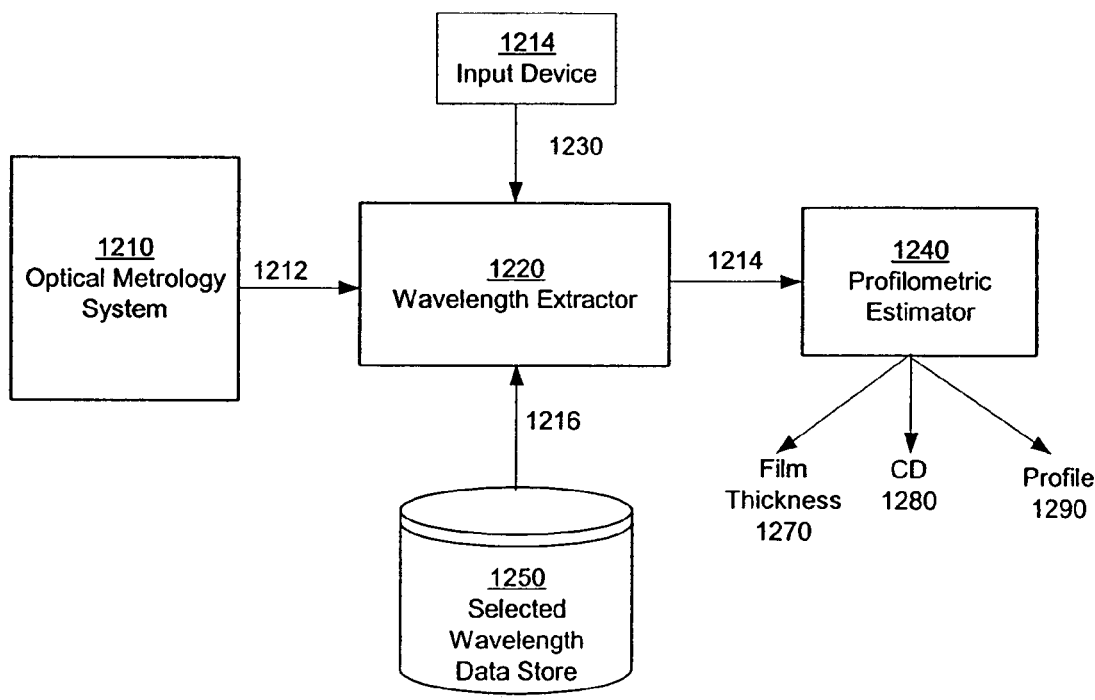
FIG. 12 is an architectural diagram of a wavelength extractor and a profilometric estimator in an exemplary embodiment.

FIG. 12 is an architectural diagram of a wavelength extractor and a profilometric estimator in an exemplary embodiment. An optical metrology system 1210, standalone or part of an integrated IC metrology system, transmits diffraction spectra measurement 1212 to a wavelength extractor 1220. Using information from an input device 1214 regarding identification of the metrology device, wafer, selection criteria, and termination criteria, the wavelength extractor 1220 accesses the selected wavelengths stored in a data store 1250. The selected wavelengths 1216 are used by the wavelength extractor 1220 to extract only the diffraction spectra data for the selected wavelengths, transmitting these data 1214 to the profilometric estimator 1240. The profilometric estimator 1240 uses regression or equivalent techniques to determine the film thickness 1270, CD 1280, and profile 1290 of the measured IC structure.

Figure 13:
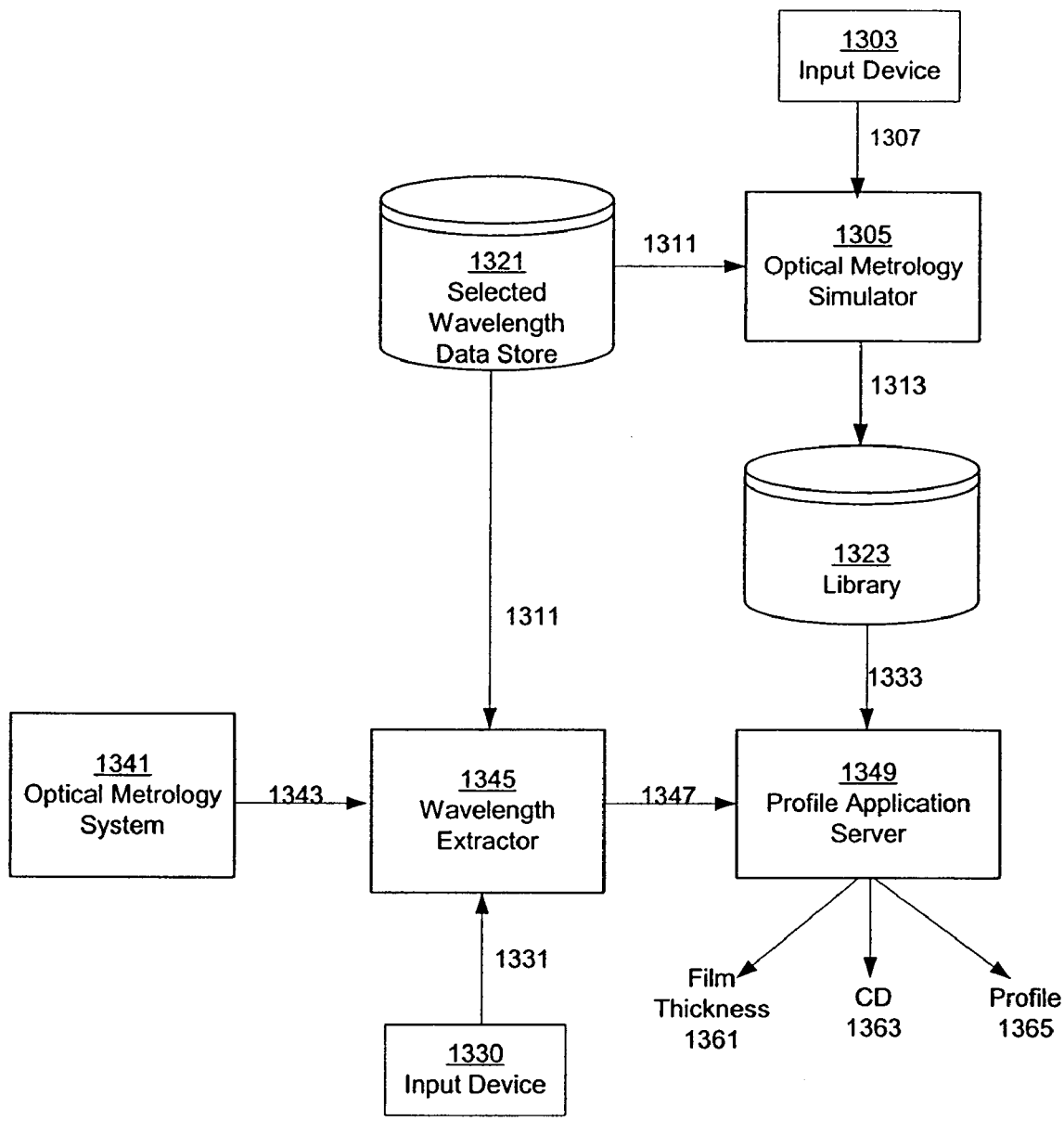
FIG. 13 is an architectural diagram of the creation and use of a library of simulated spectra and profile utilizing selected wavelengths in an exemplary embodiment.

FIG. 13 is an architectural diagram of the creation and use of a library of simulated spectra and profile utilizing selected wavelengths in an exemplary embodiment. An optical metrology simulator 1305 uses input simulation parameters 1307 specified through an input device 1303 and previously selected wavelengths 1311 specific to the application from the selected wavelength data store 1321. The optical metrology simulator 1305 creates a library 1323 of simulated diffraction spectra for a range of profile parameters and associated profile data. For a description of simulation of diffraction spectra and generation of a library, refer to co-pending U.S. patent application Ser. No. 09/907,488, entitled "Generation of a Library of Periodic Grating Diffraction Spectra", filed Jul. 16, 2001, by Niu et al., which is incorporated in its entirety herein by reference.

An optical metrology system 1341, standalone or part of an integrated IC metrology system, transmits diffraction spectra measurement 1343 to a wavelength extractor 1345. The wavelength extractor 1345 accesses the selected wavelengths 1311 stored in a data store 1321 using information on identification of the metrology device and wafer site, selection and termination criteria specified through the input device 1330. The selected wavelengths 1311 are used by the wavelength extractor 1345 to extract only the diffraction spectra data 1347 corresponding to the selected wavelengths 1311. The wavelength extractor 1345 transmits the extracted diffraction spectra data 1347 to the profile application server 1349. The profile application server 1349 selects the best match spectrum 1333 from the library 1323 and creates as output the film thickness 1361, CD 1363, and/or the structure profile 1365.

Figure 14:
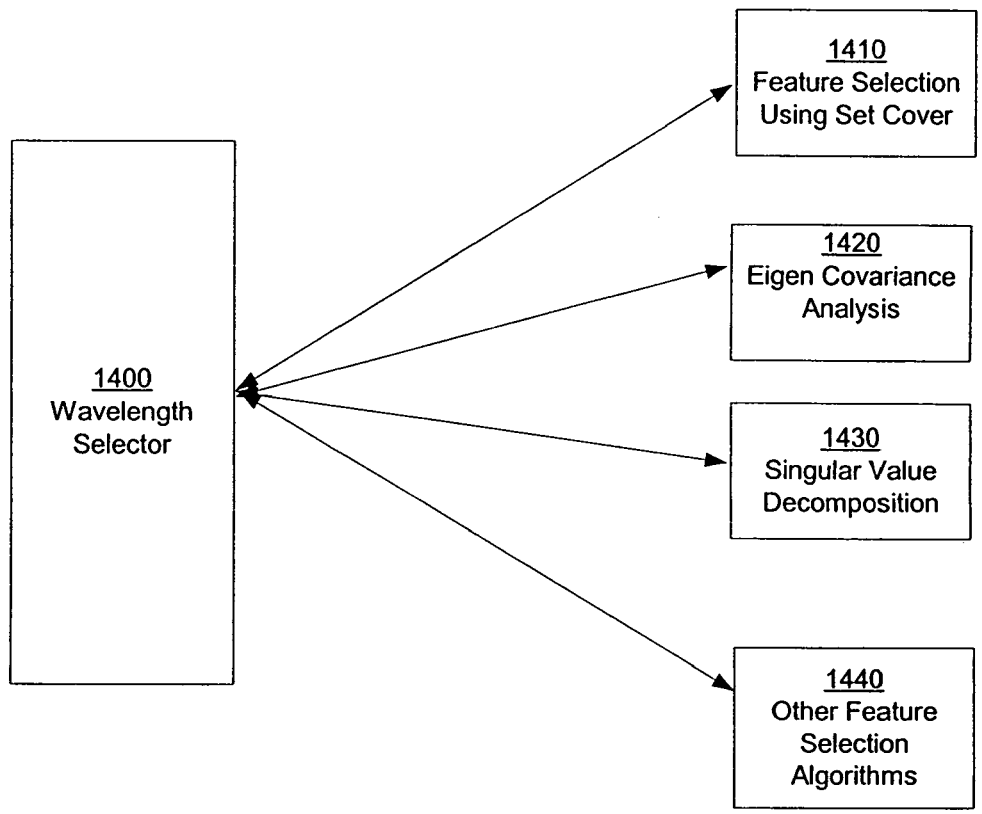
FIG. 14 is an architectural diagram of a wavelength selector invoking one or more algorithms to select wavelengths in an exemplary embodiment.

FIG. 14 is an architectural diagram of a wavelength selector invoking one or more algorithms to select wavelengths in an exemplary embodiment. The wavelength selector 1400 may use one or more algorithms to select wavelengths, namely, feature selection using set cover 1410, Eigen covariance analysis 1420, singular value decomposition 1430, or some other feature selection algorithms 1440.

Figure 15:
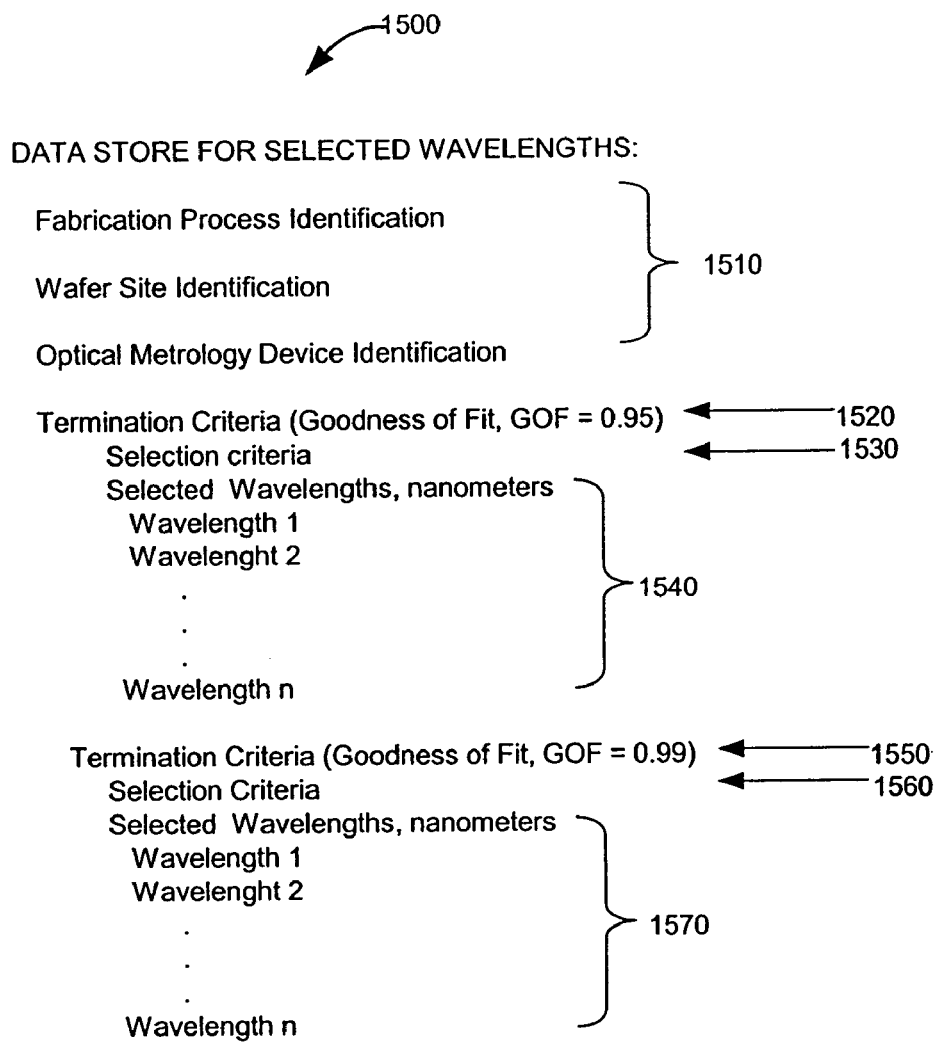
FIG. 15 is a selected wavelength data store layout in an exemplary embodiment.

FIG. 15 is a selected wavelength data store layout in an exemplary embodiment. The data store for selected wavelengths 1500 is formatted to include fabrication process, wafer site, and metrology device identification 1510. The termination criteria, 1520 and 1550, may be a cost function value or a GOF. In the example, data for a GOF of 0.95 (1520) and data for a GOF of 0.99 (1550) are shown. For each termination criteria such as GOF, one or more selection criteria, 1530 and 1560, may be specified. For each combination of termination criteria and selection criteria, a set of wavelengths, 1540 and 1570, is selected.

Reduction of the number of wavelengths used in IC optical metrology measurement, processing, and/or simulation can provide several advantages. Reduction of wavelengths can result in an exponential reduction in time for creating a library. In addition, the search time to find a best match can be similarly reduced. A similar reduction in time can be realized when a library is used for interpolation or extrapolation. Additionally, the time needed for regression analysis to determine the CD's and other profile data of IC structures can be reduced.

In particular, it is contemplated that functional implementation of the present invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by Claims following.

We claim:

1. A method of selecting wavelengths for use in optical metrology of an integrated circuit having a nominal profile, the method comprising:
   determining one or more termination criteria;
   determining one or more selection criteria;
   creating a correlation matrix for a set of diffraction spectra measured at optical metrology measurement points, the measurement points corresponding to specified wavelengths, each row and each column corresponding to one of the specified wavelengths, the correlation matrix having as matrix members correlation coefficients calculated from the diffraction spectrum values of the wavelengths corresponding to the row and column of the matrix member;
   selecting wavelengths using the set of diffraction spectra for the integrated circuit structure, the correlation matrix, the selection criteria, and a wavelength selection algorithm; and
   performing the selecting step until the termination criteria are met.

2. The method of claim 1 wherein the termination criteria for the selection of wavelengths includes testing if a selected-wavelength cost function value is less than or equal to a preset cost function value, the selected-wavelength cost function value calculated by comparing a selected-wavelength spectrum to a full-wavelength spectrum, wherein the selected-wavelength spectrum is a simulated diffraction spectrum of the nominal profile of the integrated circuit structure for a metrology device, the simulated diffraction spectrum determined using only the selected wavelengths, and wherein the full-wavelength spectrum is a simulated diffraction spectrum of the nominal profile of the integrated circuit structure for the metrology device, the simulated diffraction spectrum determined using wavelengths used for the metrology device.

3. The method of claim 1 wherein:
   the termination criteria for the selection process includes testing if a selected-wavelength cost function value is less than or equal to a preset cost function value, the selected-wavelength cost function value calculated by comparing a selected-wavelength spectrum to one of the set of diffraction spectra,
   wherein the selected-wavelength spectrum is a best match diffraction spectrum from a library of diffraction spectra created for the integrated circuit structure, the selected-wavelength spectrum best match determined using only the selected wavelengths.

4. The method of claim 1 wherein:
   the termination criteria for the selection of wavelengths includes testing if a selected-wavelength goodness of fit value is equal to or greater than a preset goodness of fit value, the selected-wavelength goodness of fit value calculated by comparing a selected-wavelength spectrum to a full-wavelength spectrum,
   wherein the selected-wavelength spectrum is a simulated diffraction spectrum of the nominal profile of the integrated circuit structure for a metrology device, the simulated diffraction spectrum determined using only the selected wavelengths, and
   wherein the full-wavelength spectrum is a simulated diffraction spectrum of the nominal profile of the integrated circuit structure for the metrology device, the simulated diffraction spectrum determined using wavelengths used for the metrology device.

5. The method of claim 1 wherein:
   the termination criteria for the selection of wavelengths includes testing if a selected-wavelength goodness of fit value is equal to or greater than a preset goodness of fit value, the selected-wavelength goodness of fit value calculated by comparing a selected-wavelength spectrum to one of the set of diffraction spectra,
   wherein the selected-wavelength spectrum is a best match diffraction spectrum from a library of diffraction spectra created for the integrated circuit structure, the selected-wavelength spectrum best match determined using only the selected wavelengths.

6. The method of claim 1 wherein the performing the selecting step until the termination criteria are met includes:
   creating a symmetric binary matrix derived from the correlation matrix, the symmetric binary matrix having members with values of one or zero,
   wherein the correlation matrix member is set to one if the correlation coefficient is equal to or greater than a correlation threshold, and
   wherein the correlation matrix member is set to zero if the correlation coefficient is less than the correlation threshold; and
   performing at least one iteration of selecting a wavelength corresponding to a row with the most number of one's in the symmetric binary matrix and setting the row and a corresponding column of the symmetric binary matrix to zeros, the row and column corresponding to the wavelength selected, the iterations of selecting a wavelength continuing until the symmetric binary matrix members are all zeros.

7. The method of claim 1 further comprising:
   saving the selected wavelengths, selection process information, and structure identification information,
   wherein the selection process information includes termination criteria for the selection of wavelengths and wavelength selection criteria.

8. The method of claim 6, wherein:
   the symmetric binary matrix is the same size as the wavelength correlation matrix; and
   each row and each column corresponding to one of the specified wavelengths.

9. The method of claim 1, wherein the correlation matrix has a first column, a second column, a first row, a second row,
   wherein the first row and first column of the correlation matrix correspond to a first wavelength;
   wherein the second row and second column of the correlation matrix correspond to a second wavelength;

wherein the matrix element at the second row and first column is the correlation coefficient of the second wavelength to the first wavelength; and wherein the matrix element at the first row and second column is the correlation coefficient of the first wavelength to the second wavelength.

10. A system for selecting wavelengths for use in optical metrology of an integrated circuit having a nominal profile, the system comprising:

an input device for specifying one or more termination criteria and one or more selection criteria; and a wavelength selector configured to:

create a correlation matrix for a set of diffraction spectra measured at optical metrology measurement points, the measurement points corresponding to specified wavelengths, each row and each column corresponding to one of the specified wavelengths, the correlation matrix having as matrix members correlation coefficients calculated from the diffraction spectrum values of the wavelengths corresponding to the row and column of the matrix member;

until the termination criteria are met, select wavelengths using the set of diffraction spectra for the integrated circuit structure, the correlation matrix, the selection criteria, and a wavelength selection algorithm.

11. The system of claim 10 further comprising:

a wavelength data store, wherein the selected wavelengths, selection process information, and structure identification information are stored, and wherein the selection process information includes termination criteria for the selection of wavelengths and wavelength selection criteria.

12. The system of claim 10, wherein the correlation matrix has a first column, a second column, a first row, a second row, wherein the first row and first column of the correlation matrix correspond to a first wavelength;

wherein the second row and second column of the correlation matrix correspond to a second wavelength;

wherein the matrix element at the second row and first column is the correlation coefficient of the second wavelength to the first wavelength; and wherein the matrix element at the first row and second column is the correlation coefficient of the first wavelength to the second wavelength.

13. A computer-readable storage medium containing computer executable instructions for selecting wavelengths for use in optical metrology of an integrated circuit having a nominal profile, comprising instructions for:

determining one or more termination criteria;

determining one or more selection criteria;

creating a correlation matrix for a set of diffraction spectra measured at optical metrology measurement points, the measurement points corresponding to specified wavelengths, each row and each column corresponding to one of the specified wavelengths, the correlation matrix having as matrix members correlation coefficients calculated from the diffraction spectrum values of the wavelengths corresponding to the row and column of the matrix member;

selecting wavelengths using the set of diffraction spectra for the integrated circuit structure, the correlation matrix, the selection criteria, and a wavelength selection algorithm; and performing the selecting step until the termination criteria are met.

14. The computer-readable storage medium of claim 13 wherein the termination criteria for the selection of wavelengths includes testing if a selected-wavelength cost function value is less than or equal to a preset cost function value, the selected-wavelength cost function value calculated by comparing a selected-wavelength spectrum to a full-wavelength spectrum, wherein the selected-wavelength spectrum is a simulated diffraction spectrum of the nominal profile of the integrated circuit structure for a metrology device, the simulated diffraction spectrum determined using only the selected wavelengths, and wherein the full-wavelength spectrum is a simulated diffraction spectrum of the nominal profile of the integrated circuit structure for the metrology device, the simulated diffraction spectrum determined using wavelengths used for the metrology device.

15. The computer-readable storage medium of claim 13 wherein:

the termination criteria for the selection process includes testing if a selected-wavelength cost function value is less than or equal to a preset cost function value, the selected-wavelength cost function value calculated by comparing a selected-wavelength spectrum to one of the set of diffraction spectra, wherein the selected-wavelength spectrum is a best match diffraction spectrum from a library of diffraction spectra created for the integrated circuit structure, the selected-wavelength spectrum best match determined using only the selected wavelengths.

16. The computer-readable storage medium of claim 13 wherein:

the termination criteria for the selection of wavelengths includes testing if a selected-wavelength goodness of fit value is equal to or greater than a preset goodness of fit value, the selected-wavelength goodness of fit value calculated by comparing a selected-wavelength spectrum to a full-wavelength spectrum, wherein the selected-wavelength spectrum is a simulated diffraction spectrum of the nominal profile of the integrated circuit structure for a metrology device, the simulated diffraction spectrum determined using only the selected wavelengths, and wherein the full-wavelength spectrum is a simulated diffraction spectrum of the nominal profile of the integrated circuit structure for the metrology device, the simulated diffraction spectrum determined using wavelengths used for the metrology device.

17. The computer-readable storage medium of claim 13 wherein:

the termination criteria for the selection of wavelengths includes testing if a selected-wavelength goodness of fit value is equal to or greater than a preset goodness of fit value, the selected-wavelength goodness of fit value calculated by comparing a selected-wavelength spectrum to one of the set of diffraction spectra, wherein the selected-wavelength spectrum is a best match diffraction spectrum from a library of diffraction spectra created for the integrated circuit structure, the selected-wavelength spectrum best match determined using only the selected wavelengths.

18. The computer-readable storage medium of claim 13 wherein the instructions for performing the selecting step until the termination criteria are met includes instructions for:

creating a symmetric binary matrix derived from the correlation matrix, the symmetric binary matrix having members with values of one or zero, wherein the correlation matrix member is set to one if the correlation coefficient is equal to or greater than a correlation threshold, and wherein the correlation matrix member is set to zero if the correlation coefficient is less than the correlation threshold; and performing at least one iteration of selecting a wavelength corresponding to a row with the most number of one's in the symmetric binary matrix and setting the row and a corresponding column of the symmetric binary matrix to zeros, the row and column corresponding to the wavelength selected, the iterations of selecting a wavelength continuing until the symmetric binary matrix members are all zeros.

19. The computer-readable storage medium of claim 18, wherein:

the symmetric binary matrix is the same size as the wavelength correlation matrix; and each row and each column corresponding to one of the specified wavelengths.

20. The computer-readable storage medium of claim 13, wherein the correlation matrix has a first column, a second column, a first row, a second row, wherein the first row and first column of the correlation matrix correspond to a first wavelength;

wherein the second row and second column of the correlation matrix correspond to a second wavelength;

wherein the matrix element at the second row and first column is the correlation coefficient of the second wavelength to the first wavelength; and wherein the matrix element at the first row and second column is the correlation coefficient of the first wavelength to the second wavelength.

* * * * *